April 4, 1950     F. H. LUHDORFF ET AL     2,502,797
FRUIT HANDLING MACHINE
Filed Feb. 19, 1944     11 Sheets-Sheet 2
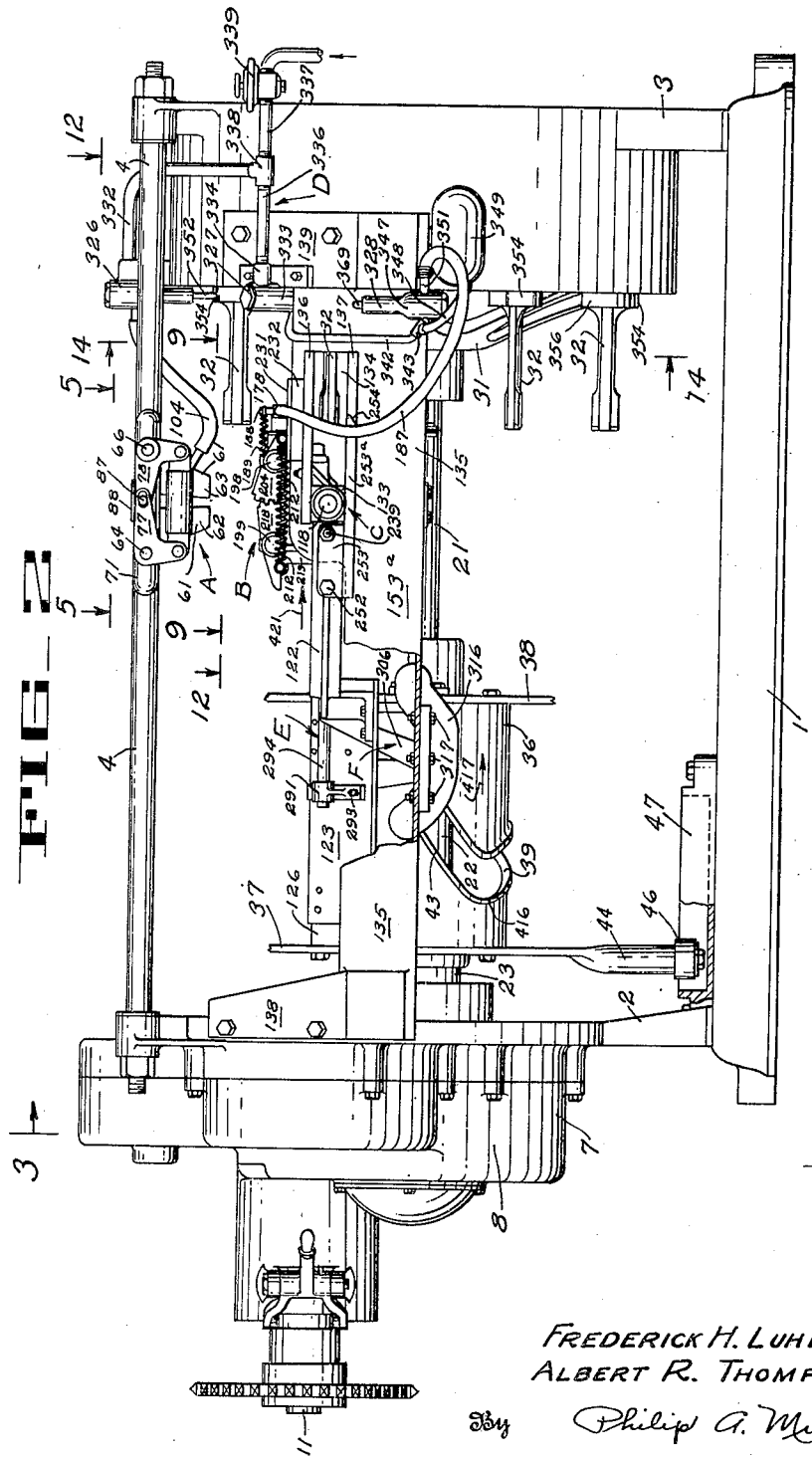
FIG_2
Inventor
FREDERICK H. LUHDORFF
ALBERT R. THOMPSON.
By Philip A. Minnis
Attorney April 4, 1950　　F. H. LUHDORFF ET AL　　2,502,797
FRUIT HANDLING MACHINE
Filed Feb. 19, 1944　　11 Sheets-Sheet 3

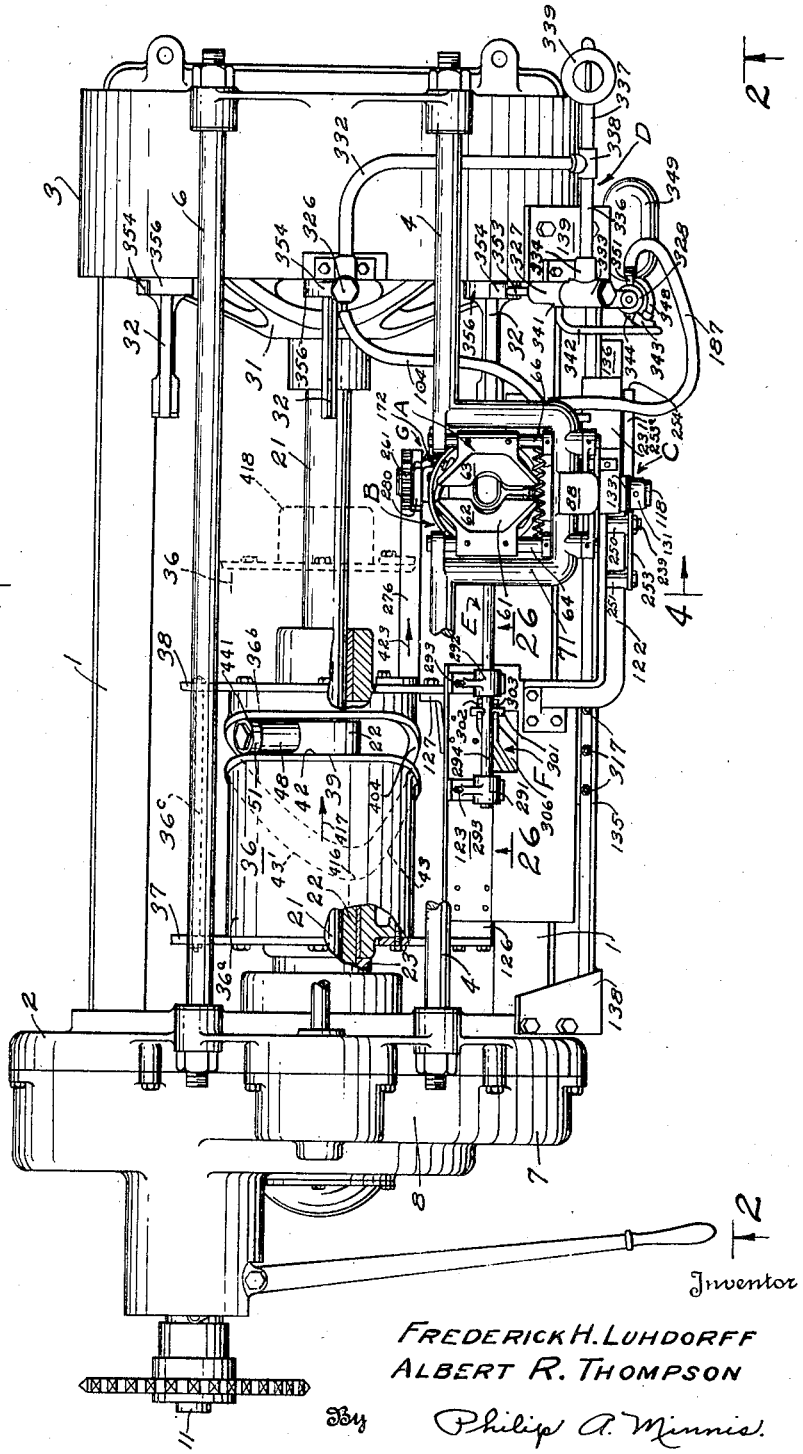

Inventor
FREDERICK H. LUHDORFF
ALBERT R. THOMPSON
By Philip A. Minnis
Attorney

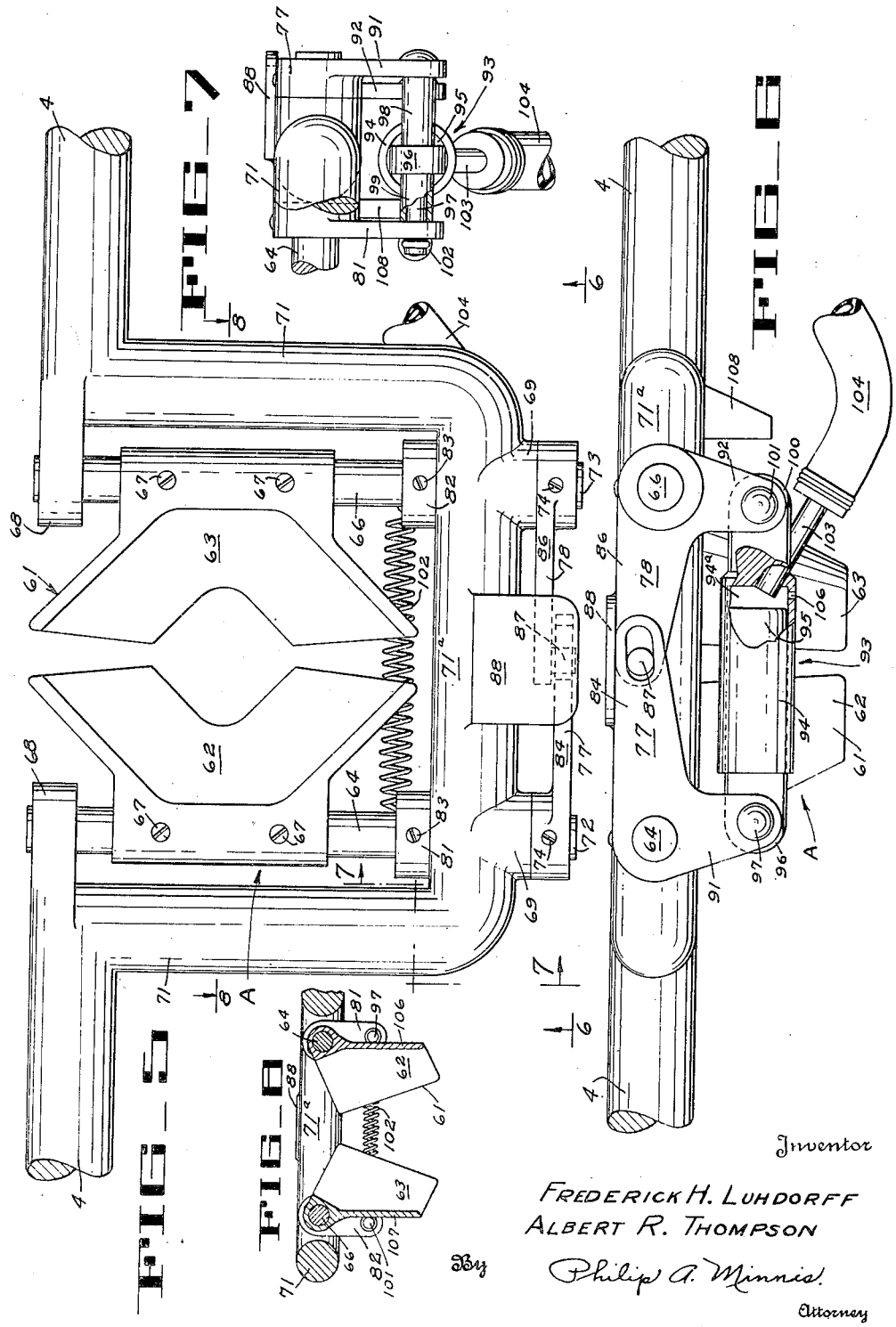

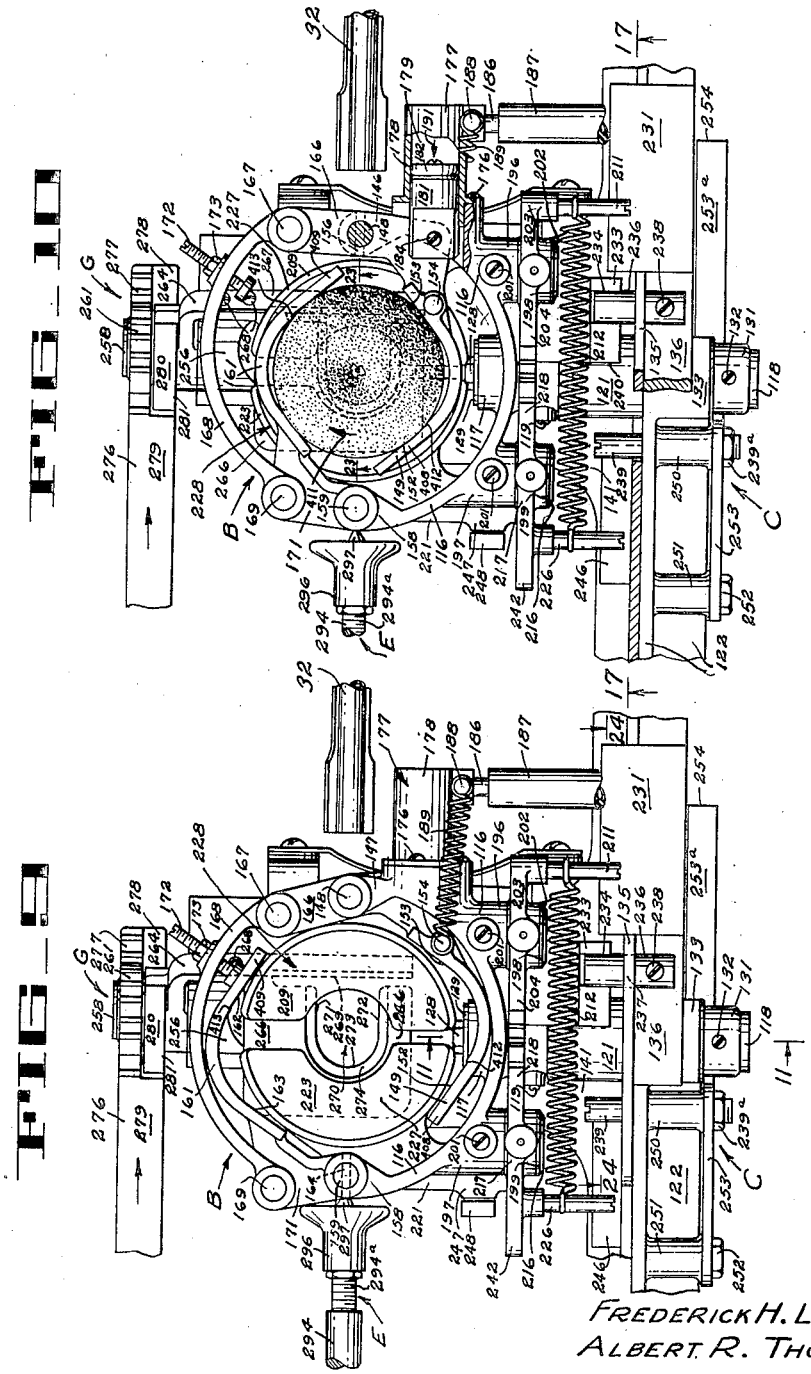

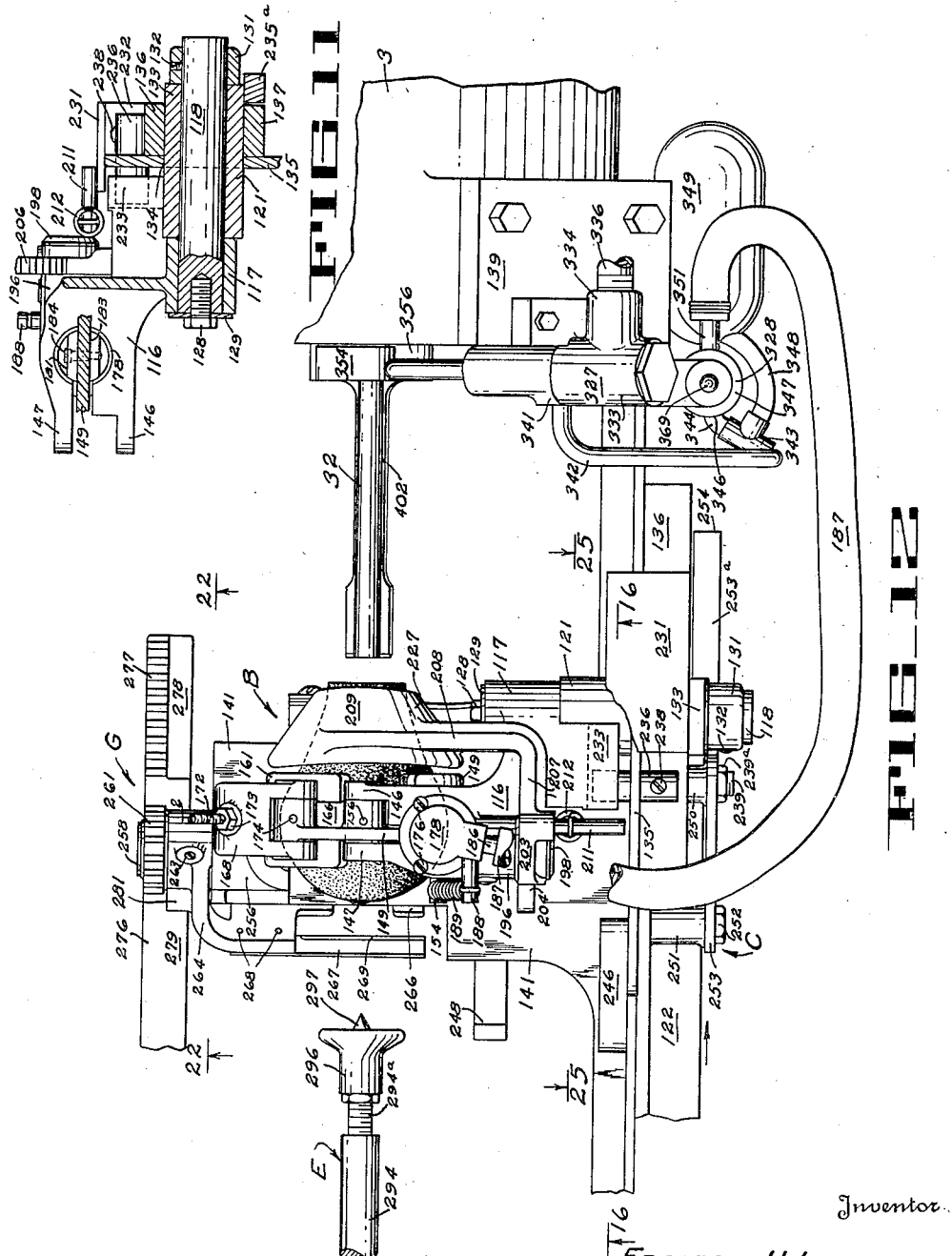

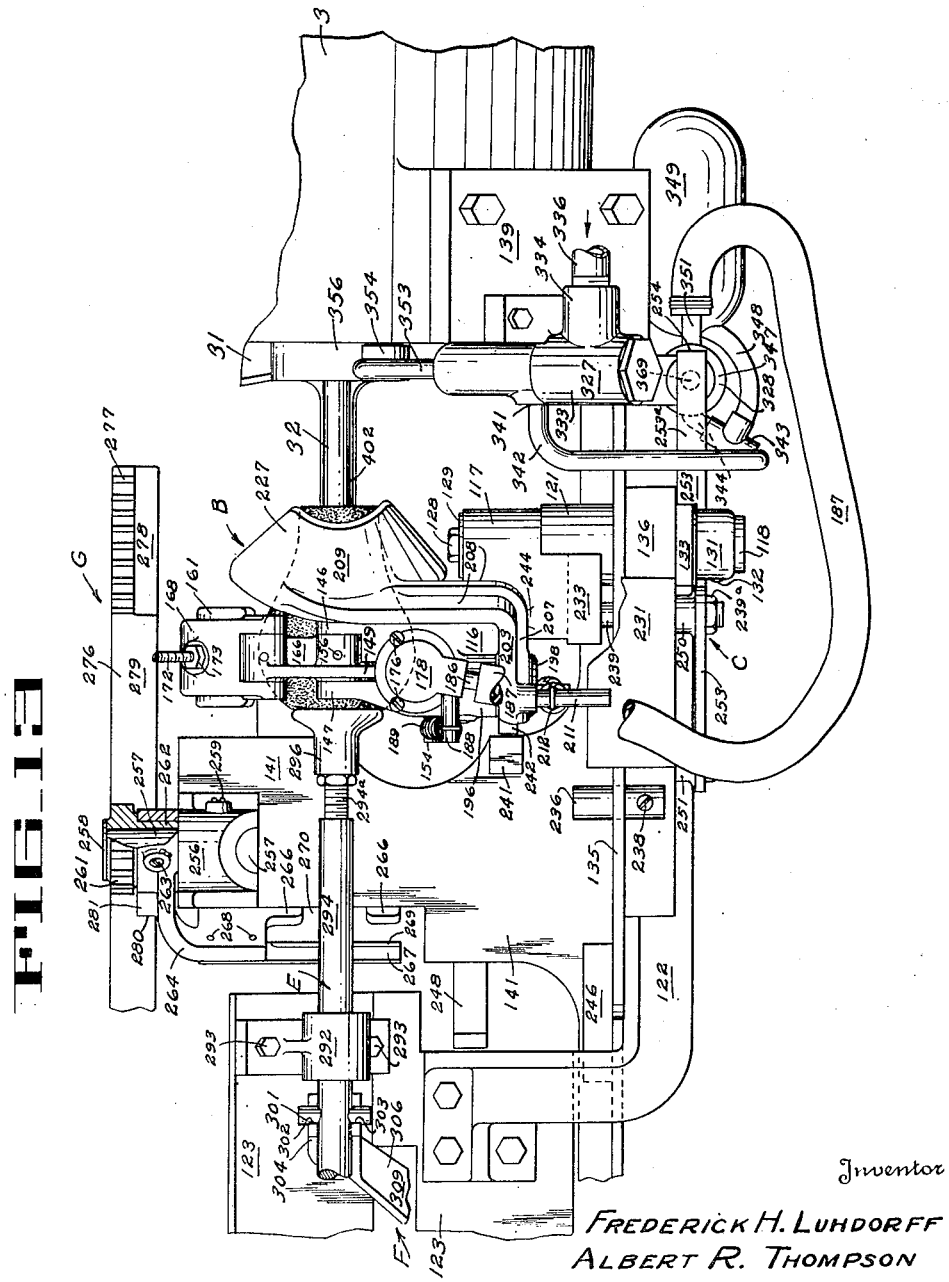

April 4, 1950 F. H. LUHDORFF ET AL 2,502,797
FRUIT HANDLING MACHINE
Filed Feb. 19, 1944 11 Sheets-Sheet 8
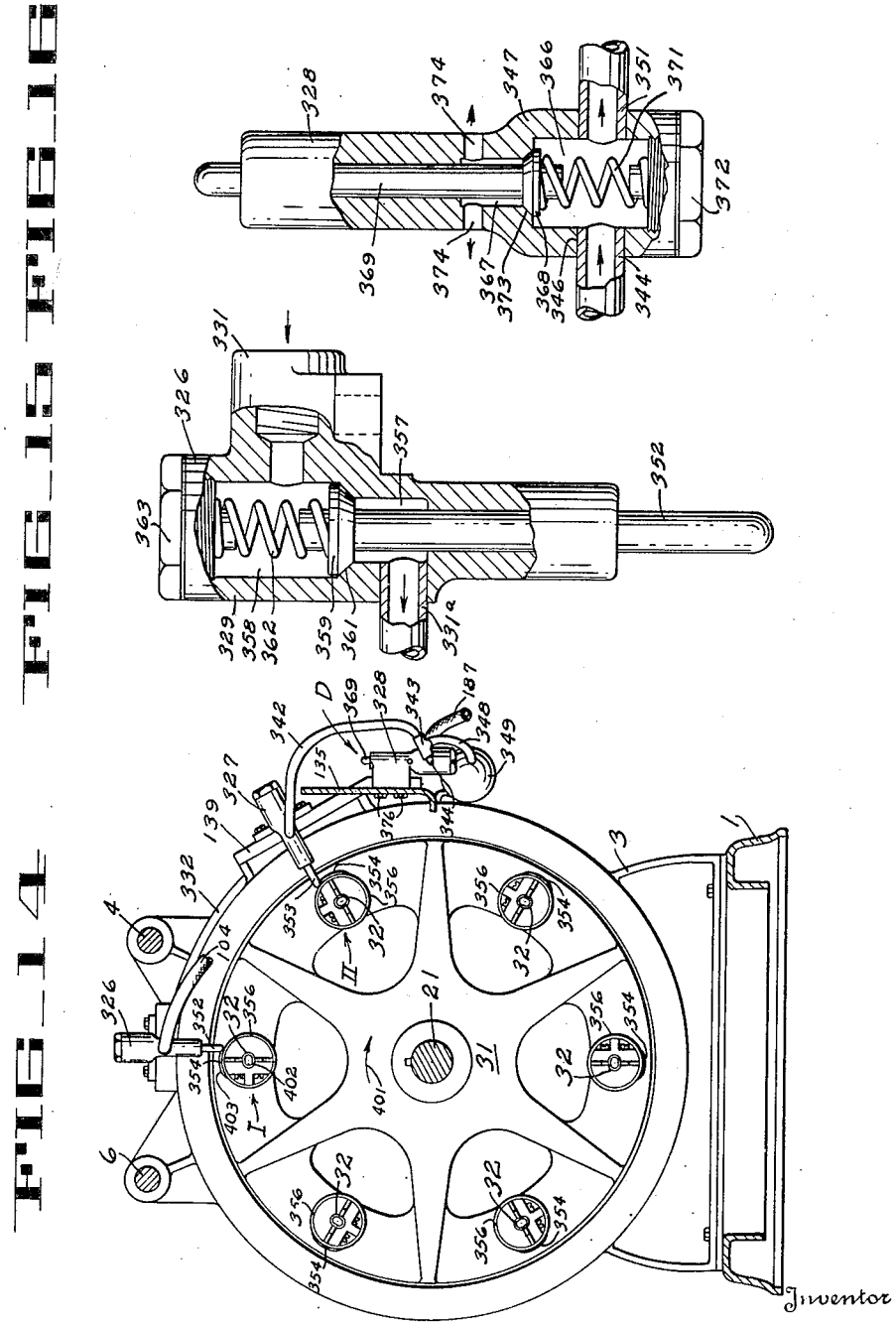
Inventor
FREDERICK H. LUHDORFF
ALBERT R. THOMPSON
By Philip A. Minnis.
Attorney

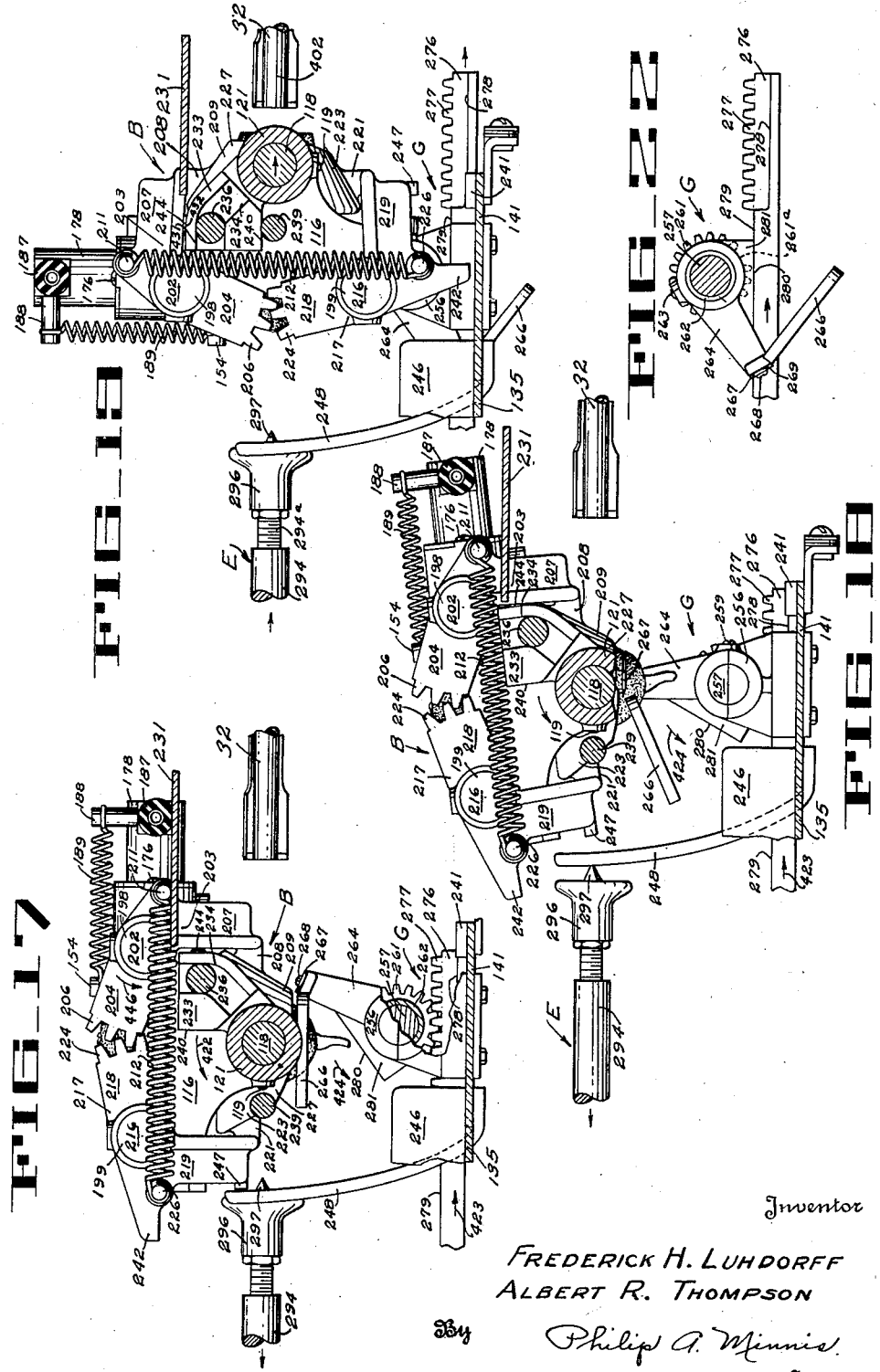

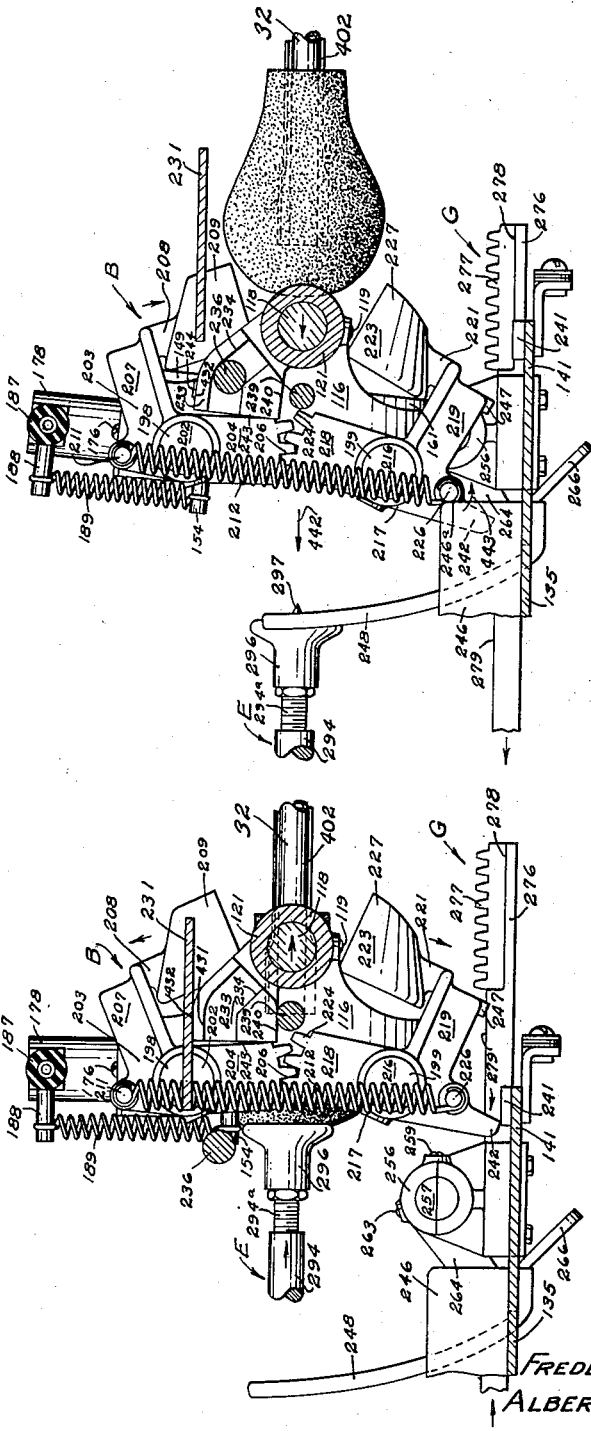

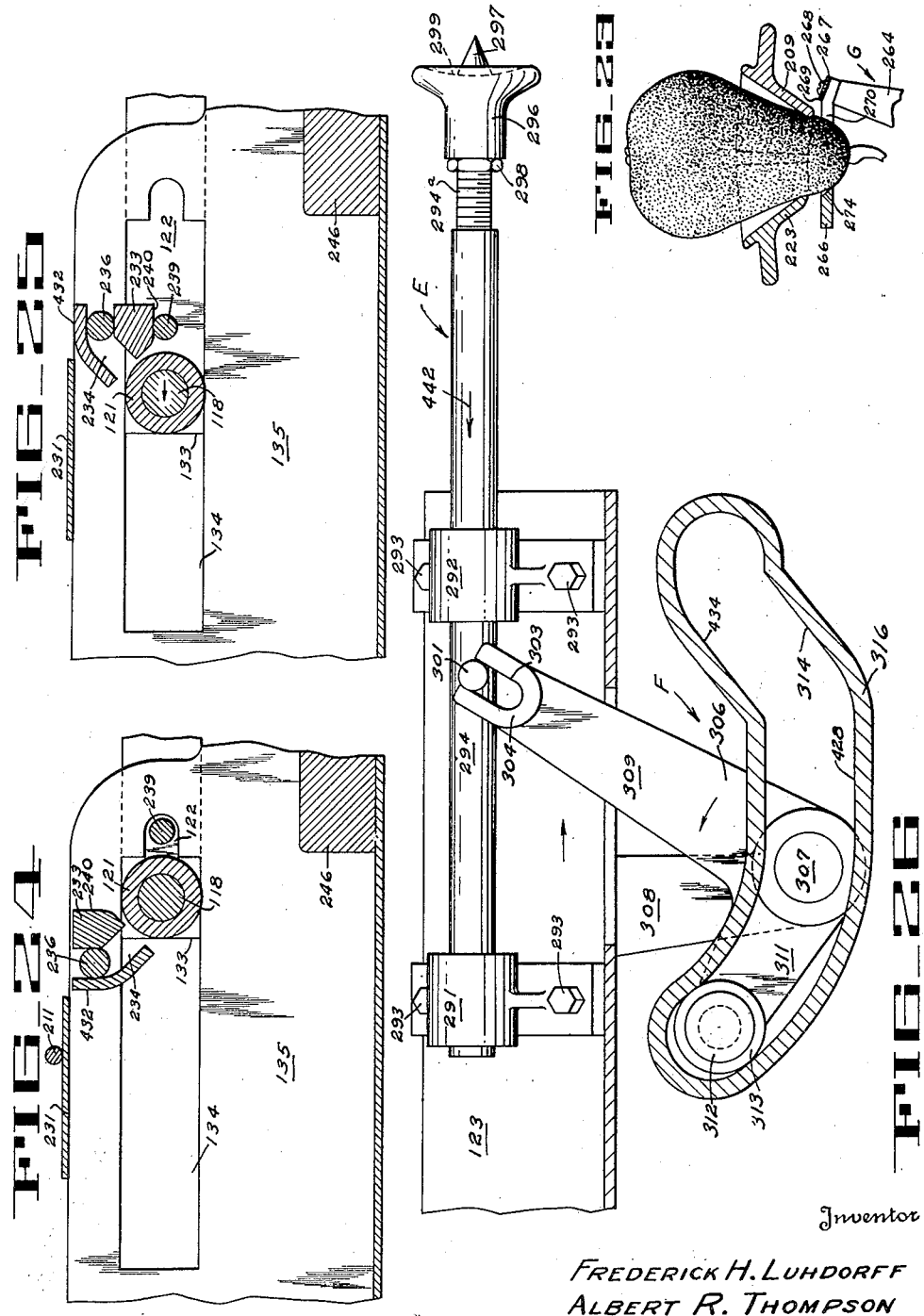

Patented Apr. 4, 1950

2,502,797

UNITED STATES PATENT OFFICE 2,502,797

FRUIT HANDLING MACHINE

Frederick H. Luhdorff, San Jose, and Albert R. Thompson, Los Gatos, Calif., assignors to Food Machinery and Chemical Corporation, a corporation of Delaware Application February 19, 1944, Serial No. 523,084

29 Claims. (Cl. 146—51)

The present invention appertains to a machine for handling fruit such as pears, or the like, and relates more particularly to a feed mechanism for pear preparation machines.

A general object of the present invention is to provide a feed mechanism for pear preparation machines which enables the operator to feed the machine in a comfortable and natural rhythm without nervous strain and to maintain a proper continuity of feeding during the operation of the same.

Another object of the present invention is to provide a feed mechanism for pear preparation machines which is easy to feed and enables the operator to feed more pears in a given time to the machine so that the same may be operated at a high speed whereby its fruit handling capacity is materially increased.

Another object is to provide a feed mechanism for feeding pears to the fruit holder of a pear preparation machine in a very efficient and accurate manner.

Another object is to provide a feed mechanism for receiving the pears stem end down and for feeding them to horizontally disposed fruit holders of a pear preparation machine with their stem-blossom axes in alignment therewith.

Other and further objects and advantages of the present invention will become apparent from the following description and drawings in which:

Fig. 1 is a plan view of a pear preparation machine equipped with the feed mechanism of the present invention, certain parts of the machine being omitted for purposes of clarity.

Fig. 2 is a side view of Fig. 1 taken in the direction of arrows 2—2 thereof.

Fig. 5 is an enlarged plan view of the fruit receiving unit of the feed mechanism, certain parts being broken away.

Fig. 6 is a side elevation of Fig. 5 taken in the direction of arrows 6—6 thereof. Certain portions of Fig. 6 are broken away and others are shown in section.

Fig. 7 is a section of a portion of Fig. 5 taken along lines 7—7 thereof.

Fig. 8 is a reduced section of a portion of Fig. 5 taken along lines 8—8 thereof, the fruit receiving pocket being shown in open fruit discharging position and certain parts being omitted.

Fig. 9 is an enlarged plan view of the feed unit of the feed mechanism and certain parts of the pear preparation machine cooperating therewith, the view being taken in the direction of arrows 9—9 of Fig. 2, the fruit holding and centering clamps of the feed mechanism being shown in open fruit receiving position.

Fig. 10 is a view similar to Fig. 9 with a pear positioned in the feed unit and the fruit holding and centering clamps in closed position, certain parts being broken away while others are shown in section.

Fig. 11 is a section through a portion of Fig. 9 taken along lines 11—11 thereof, certain parts being omitted.

Fig. 12 is an enlarged plan view of a portion of Fig. 2 taken in the direction of arrows 12—12 thereof, the feed unit of the feed mechanism being shown in tilted position with a pear held therein ready for transfer onto a stemming tube of the machine. The fruit receiving unit and certain portions of the machine are omitted.

Fig. 13 is a view similar to Fig. 12 illustrating the position of the feed unit during the transfer of the pear therefrom onto a stemming tube of the machine. Certain additional parts of the machine omitted in Fig. 12 are shown in Fig. 13.

Fig. 14 is a transverse section of Fig. 2 taken along lines 14—14 thereof.

Figs. 15 and 16 are enlarged detail views partially in section and partially in elevation illustrating certain control valves of the feed mechanism of the machine.

Fig. 17 is a section of the feed unit of Fig. 10 taken along lines 17—17 thereof, certain portions being broken away.

Figs. 18 to 21 inclusive, are views similar to Fig. 17 illustrating various positions of the feed unit and its parts during the operation of the machine. Certain portions of Fig. 18 have been broken away to clearly show the operation of the stem end cutting knife.

Fig. 22 is a section taken along lines 22—22 of Fig. 12.

Fig. 23 is a section through the stem end centering cup and a portion of the stem end cut off mechanism of the feed unit of the machine taken along lines 23—23 of Fig. 10.

Figure 4:
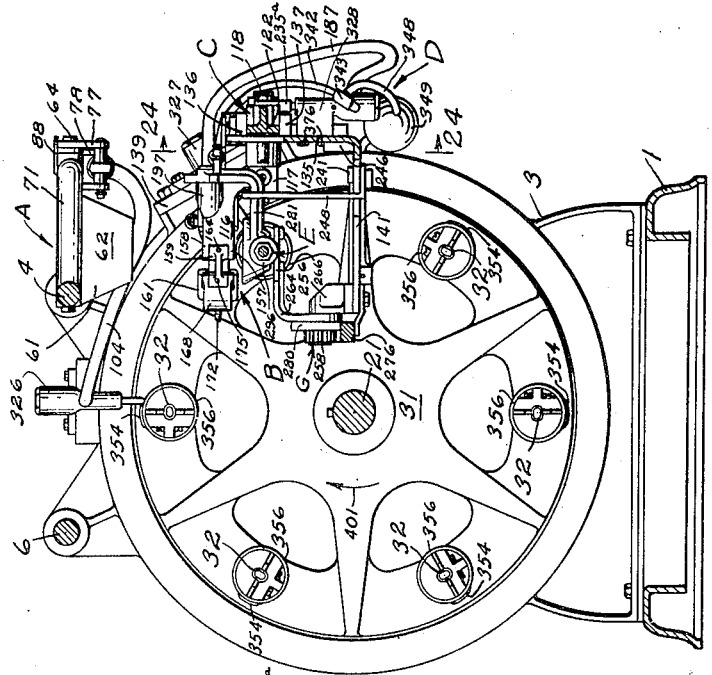
Fig. 4 is a transverse section of the machine shown in Fig. 1 taken along lines 4—4 thereof.

Fig. 24 is an enlarged section of a portion of Fig. 4 taken along lines 24—24 thereof. The section is also indicated at 24—24 in Fig. 9.

Fig. 25 is a section similar to Fig. 24 but showing the respective parts in the positions they assume when the feed unit is in the position shown in Figs. 12 and 19, the section being taken along lines 25—25 of Fig. 12.

Fig. 26 is an enlarged section of a portion of Fig. 1 taken along lines 26—26 thereof.

The feed mechanism of the present invention is designed for feeding pears to horizontally disposed fruit holders of a pear preparation machine and comprises in general (see Figs. 1 to 4) a fruit receiving unit A, a feed or transfer unit B, a feed unit actuating mechanism C, a pneumatic control mechanism D, a fruit pusher E and fruit pusher actuating mechanism F, and a stem end gauging and cutting mechanism G.

In the operation of the feed mechanism the pears are successively and continuously fed by the operator to the feed mechanism by dropping one pear at a time stem end down into the fruit receiving unit A which positions and aligns the pears received therein in a predetermined manner with respect to the feed unit B vertically disposed therebeneath. The receiving unit A is then actuated to drop the positioned pear stem end first from the receiving unit into the feed unit B which accurately centers and aligns the pear with the stem blossom axis thereof disposed in a predetermined vertical position and firmly holds the pear in said position. The operation of the receiving unit A and the centering, aligning and holding operation of the feed unit B is controlled by the pneumatic control mechanism D in timed relation with respect to the operation of the fruit holders of the pear preparation machine to which the pears are to be fed.

After the pear has been centered and aligned in the feed unit B, and while it is firmly held thereby, the feed unit B is swung into horizontal or tilted position whereby the stem blossom axis of the pear is aligned with the axis of one of the horizontally disposed fruit holders of the machine. These fruit holders may be in the form of stemming tubes, and are so illustrated in the present disclosure. The feed unit B with the pear firmly held therein is then shifted toward the fruit holder of the machine whereby the pear is partially impaled upon the fruit holder. Thereupon the pneumatic control mechanism D effects release of the pear from the feed unit B and the fruit pusher E engages the calyx end of the pear, pushes the pear partially from within the feed unit B and further impales the pear to the desired extent upon the fruit holder of the machine in proper alignment therewith. Finally the feed unit B and the pusher E are returned to their original positions, the next pear is fed into the feed unit B by the receiving unit A and is impaled upon the next fruit holder of the machine in the same manner as above described. In this way the operation of the feed mechanism continues so that the pears are fed successively and continuously to the machine during the operation thereof.

In the drawings the feed mechanism of the present invention has been illustrated as applied to a pear preparation machine of the type shown in United States Patent No. 2,139,704, issued December 13, 1938, upon an application filed by A. R. Thompson et al., the rotary feeding device of the patent being omitted and the present feed mechanism substituted therefor.

The pear preparation machine illustrated herein (see Figs. 1 to 4) comprises a base 1 provided with a pair of opposed end standards 2 and 3 secured thereto and rigidly interconnected by a pair of tie rods 4 and 6. The standard 2 is provided with a cover 7 which forms in conjunction therewith a gear casing 8 within which the drive mechanism of the machine, generally indicated at 9, is arranged.

The drive mechanism 9 comprises a main drive shaft 11 provided with a drive pinion 12 keyed thereto which intermeshes with the teeth 13 of a Geneva driver 14 keyed to a shaft 16 rotatably mounted within the gear casing 8. The Geneva driver 14 is provided with a drive pin 17 which engages the radial slots 18 of a Geneva gear 19 keyed to one end of a turret shaft 21. The turret shaft 21 extends from the gear casing 8 through a sleeve 22 and is freely rotatable therein. The sleeve 22 in turn is rotatably mounted in a bearing 23 (Fig. 1) of the standard 2. One end of the sleeve 22 extends into the gear casing 8 and carries a gear 24 (Fig. 3) fixed thereto which intermeshes with a gear 26 keyed to shaft 16 previously referred to.

The other end of the turret shaft 21 is rotatably mounted in a bearing in the standard 3 and carries a peeling turret 31 fixed thereto for rotation therewith. The peeling turret 31 is provided with a plurality of horizontally disposed fruit holders or stemming tubes 32 upon which the pears to be peeled, cored and halved by the machine are impaled stem end first.

Reciprocably mounted on the sleeve 22 and the turret shaft 21 (see Figs. 1 and 2) is a cam cylinder 36 provided with end plates 37 and 38 and a continuous cam slot 39 a portion 42 of which extends part way around the cam cylinder in a plane at right angles to the axis of the cylinder, and the remainder of its length includes a pair of reversely related angular portions 43 and 43'. The two halves 36$^a$ and 36$^b$ of the cam cylinder 36 are held together by spacer rods 36$^c$ only one of which being shown in Fig. 1. The sleeve 22 and shaft 21 are freely rotatable relative to each other as well as to the cam cylinder 36 but rotation of the cam cylinder 36 is prevented by a depending guide post 44 forming a part of the end plate 37 and provided with a guide roller 46 which runs in a rectilinear guide channel 47 secured to the base 1 of the machine. Rotatably mounted on a radially extending arm 48 (Fig. 1) fixed to the free end of sleeve 22 is a cam roller 51 which travels in the cam slot 39 of the cam cylinder 36 and causes reciprocation of the latter upon rotation of the sleeve 22.

From the above it will be seen that, upon rotation of the drive shaft 11, the turret shaft 21, turret 31 and fruit holders 32 are intermittently rotated by means of the Geneva drive mechanism 14, 19. A Geneva locking cam 52 which cooperates with arcuate faces 53 of the Geneva gear 19 in well known manner locks the Geneva gear against rotation while it is at rest. The rotation of the drive shaft 11, gear 14 and shaft 16 also causes a continuous rotation of gears 26, 24, sleeve 22, arm 48 and cam roller 51 thereby effecting reciprocation of the cam cylinder 36 in proper timed relation with respect to the operation of the turret 31 of the machine.

The machine is further provided with peeling, coring, calyx trimming, halving and fruit discharging means which have been omitted from the drawings since they do not form a part of the invention disclosed herein. For a complete understanding of the construction and operation of these devices as well as other specific details of the construction and operation of the machine reference may be had to the Thompson et al. patent previously referred to.

The fruit receiving unit A (Figs. 1 to 8) comprises a fruit receiving pocket 61 (Fig. 5) made up of two complementary separable sections 62 and 63 fixed on pivot shafts 64 and 66, respectively, by means of set screws 67. The shafts 64 and 66 are rotatably mounted within bearings 68 and 69 of a U-shaped frame structure 71 forming a part of the tie rod 4 previously referred to herein.

Fixed to the ends 72 and 73 of the shafts 64 and 66 exterior of the portion 71ᵃ of the frame 71 by means of set screws 74 are bell cranks 77 and 78, respectively, while disposed within the frame 71 are vertically depending arms 81 and 82 carried by shafts 64 and 66 and fixed thereto by means of set screws 83. The horizontally disposed arms 84 and 86 of the bell cranks 77 and 78 are operatively interconnected by a pin and slot connection 87 (Fig. 6) and abut against an overlying abutment plate 88 secured to the frame portion 71ᵃ to thereby limit the extent of closing of the pocket sections 62 and 63.

Interposed between the vertically depending arm 91 of bell crank 77 and the vertically depending arm 81 on one side and the vertically depending arm 92 of bell crank 78 as well as the vertically depending arm 82 on the other side is a pneumatic pocket actuating mechanism 93 comprising an air cylinder 94 having a piston 95 slidably positioned therein (Figs. 6, 7 and 8).

The outer end 96 of piston 95 is pivotally secured to the arm 91 of bell crank 77 and arm 81 by means of a pin 97. Spacing sleeves 98 and 99 interposed between the free end 96 of piston 95 and arms 91 and 81 maintain the piston in properly spaced relation with respect to said arms. The piston 95 is slidably positioned within the bore 94ᵃ of cylinder 94 and the closed end of the cylinder is provided with an ear 100 which is pivotally secured to arm 92 of bell crank 78 and arm 82 by a pin 101. The cylinder 94 is held in properly spaced relation with respect to the arms 82 and 92 on pin 101 by means of spacing sleeves (not shown) in the same manner as described in connection with piston 95.

The outer ends of pins 97 and 101 extend slightly beyond the arms 81 and 82 (Figs. 7 and 8) and interposed between the pins and secured thereto is a coil spring 102 which normally holds the sections 62 and 63 of the receiving pocket 61 in closed position, as shown in Figs. 5 and 6, with the arms 84 and 86 of bell cranks 77 and 78 abutting against plate 88.

The cylinder 94 is provided with an air inlet 103 to which a flexible air hose 104 of the pneumatic control mechanism D is connected. A small hole 106 (Fig. 6) in the wall of the cylinder 94 permits bleeding of air therefrom to permit rapid closing of the fruit receiving pocket 61 under the action of the coil spring 102 when the air supply to the cylinder 94 is turned off.

The fruit receiving pocket 61 which comprises the two complementary sections or halves 62 and 63 forms, when closed, an approximately conical pocket open at the base and apex thereof which is adapted to receive and hold a pear with its stem end down, to position the pear with its stem blossom axis substantially vertical and to center the pear with respect to the feed unit B positioned thereneath. It is important to note that the halves 62 and 63 of the fruit receiving pocket 61 are mounted below and extend downwardly from their supporting shafts 64 and 66 so that when the pocket is opened as shown in Fig. 8 the sides 106 and 107 of opposing halves 62 and 63 which engage and support the pear when the pocket is closed are suddenly moved away from each other when the pocket opens so that the pear resting within is suddenly freed completely and is dropped without rubbing against the sides of the pocket and hence without changing the position or alignment of the stem blossom axis of the fruit as it drops into the feed unit B thereneath.

During the operation of the pear preparation machine the receiving pocket 61 opens and closes in timed relation therewith. As above stated, the pocket 61 is normally held in closed position by the coil spring 102 and when in this position the operator drops a pear stem end down into the same. Due to the substantially conical shape and vertical disposition of the pocket 61 the pear is positioned therein stem end down with the stem blossom axis of the fruit in substantially vertical position and centered with respect to the feed unit B thereneath.

After the pear has been positioned in this manner in the receiving pocket 61 and when the feed unit B is in upright or fruit receiving position, compressed air is admitted into the cylinder 94 causing sudden relative movement between the same and piston 95 which rocks the bell cranks 77, 78 and shafts 64, 66 thereby quickly opening the pocket 61 against the tension of spring 102 (Fig. 8) whereby the pear is released and dropped into the feed unit B. The extent of opening of the pocket 61 is limited by a stop 108 against which one of the spacing sleeves on pin 101 abuts. As soon as the pear is discharged from within the pocket 61 further admission of compressed air to the cylinder 94 is stopped in a manner to be explained later herein and the pocket thereupon quickly closes under the action of the coil spring 102 until the arms 84 and 86 of bell cranks 77 and 78 contact the abutment plate 88 (Fig. 6) and the pocket is again in position to receive the next pear.

During the actuation of the pneumatic actuating unit 93 as above stated, air bleeds continuously through the small hole 106 in the cylinder 94. This hole, however, is so dimensioned with respect to the air pressure employed that the escape of air is insufficient to interfere with the proper operation of the unit 93 when the air is being admitted to the cylinder, but permits sufficiently rapid discharge of the air from the cylinder 94 during closing of the pocket 61 under the action of spring 102 when the supply of compressed air to the cylinder 94 is cut off.

The opening and closing action of the feed pocket 61 is very rapid so that the pear is dropped from the pocket without disturbing the position and alignment of the fruit. Consequently the pocket is open only momentarily and is closed and in fruit receiving position most of the time during the cycle of operation thereof to give the operator sufficient time to conveniently feed the fruit thereto without timing his motions too closely to the machine. This enables the operator to continuously feed the pears to the pocket 61 in a natural rhythm without nervous strain.

When the pear preparation machine is operated at a speed of 60 pears per minute, for instance, one complete cycle of operation of the fruit receiving unit A is performed in one second. During this one second, the pocket is always closed and in fruit receiving position with the exception of a period of about one-twentieth of a second during which the pocket rapidly opens and closes to discharge the fruit therefrom. Therefore, the operator has ample time to feed the pocket 61 and he may feed the pear thereto at any time while the pocket is closed.

The feed unit B is mounted below the fruit receiving unit A and is in axial alignment therewith when the feed unit is in upright or fruit receiving position to receive the fruit from pocket 61 of the unit A. This position of the feed unit is illustrated in Figs. 1 to 4 and 9.

The feed unit B comprises a frame or casting 116 (Figs. 9, 10 and 11) provided with a boss 117 within which a pivot shaft 118 is fixed by means of a set screw 119. The pivot shaft 118 is rotatably supported within a boss 121 formed on the free end of a bracket 122 (Figs. 1, 2, 9 and 10) secured at its other end to a plate 123 in turn connected by brackets 126 and 127 to the end plates 37 and 38, respectively, of the cam cylinder 36. Secured to one end of pivot shaft 118 by means of a cap screw 128 is a retaining washer 129 while a retaining collar 131 is secured to the other end of the shaft by a set screw 132 so as to maintain the pivot shaft 118 in proper position within the bosses of the casting 116 and bracket 122. A portion 133 of the boss 121 on the free end of bracket 122 is of square configuration and is slidably mounted within a rectangular slot 134 of a plate 135 (Figs. 1, 2, 12, 24 and 25) and is guided by means of guide rails 136 and 137 secured to the plate 135 in any convenient manner. The plate 135 extends between the standards 2 and 3 and is secured to the latter by means of brackets 138 and 139, respectively. The plate 135 is provided with a horizontally disposed transverse extension 141 (see Figs. 4, 12 and 13).

From the above it will be seen that upon reciprocation of the cam cylinder 36 during the operation of the pear preparation machine the plate 123, bracket 122, pivot shaft 118 and casting 116 are reciprocated in unison with the square portion 133 of the bracket 122 properly guided between the guide rails 136 and 137.

Pivotally mounted within ears or bearings 146 and 147 on one side of the casting 116 by means of a pivot pin 148 (Figs. 9 and 10) is a pear centering and holding arm 149 having pear engaging faces 152 and 153 disposed at right angles with respect to each other. The arm 149 is further provided with an upstanding pin 154, and a lock pin 156 extending through arm 149 and pivot pin 148 holds the latter in position. Pivotally mounted on the other side of the casting 116 by means of ears or bearings 157, 158 and a pivot pin 159 is another pear centering and holding arm 161. This arm is similar to arm 149, and is positioned opposite the same for cooperation therewith and provided with pear engaging faces 162 and 163 disposed at right angles with respect to each other. The pivot pin 159 is held in position by a lock pin 164 (Fig. 4).

Pivotally secured to a rearward extension 166 of arm 149 by means of a pivot pin 167 is a curved equalizer arm 168 which is also pivotally attached by a pin 169 to an ear 171 of arm 161. An adjustable abutment screw 172 provided with a lock nut 173 on equalizer arm 168 is adapted to limit opening of the fruit holding and centering arms 149 and 161 to any desired extent. Lock pins 174 and 175 hold pins 167 and 169, respectively, in position.

Secured to the casting 116 by means of screws 176 is a pneumatic actuating unit 177 which consists of a cylinder 178 having a bore 179 within which a piston 181 provided with a packing 182 (Fig. 10) is slidably mounted. The outer end of the piston 181 is transversely slotted at 183 (Fig. 11) to straddle the pear holding arm 149 and is pivotally secured to the arm by a pivot pin 184.

The cylinder 178 has an air inlet 186 to which a flexible air hose 187 of the pneumatic control mechanism D is attached. Extending upwardly from the cylinder 178 is a pin 188 while a coil spring 189 is secured with its ends to pins 154 and 188 and normally holds the pear holding and centering arms 149 and 161 in open position. The extent of opening of these arms is limited by the abutment screw 172 which arm 161 contacts in its open position as shown in Fig. 9.

From the above it will be seen that in view of the connection of arms 149 and 161 by the equalizer arm 168 both arms are interconnected for simultaneous equalized movement about their pivot pins 148 and 159. Therefore when no force is exerted upon the piston 181 in the direction of arrow 191 (Fig. 10), arm 149 and consequently also arm 161 are held in open fruit receiving position under the action of coil spring 189 with arm 161 abutting against abutment screw 172. However, when compressed air is admitted to the cylinder 178 by the pneumatic control mechanism D the piston 181 is forced in the direction of arrow 191 effecting equalized closing of arms 149 and 161 about their pivots 149 and 159, respectively.

The casting 116 of the feed unit B is further provided with bosses 196 and 197 within which pivot shafts 198 and 199, respectively, are fixed by means of set screws 201 (Figs. 9, 10 and 17 to 21). The free end of pivot shaft 198 terminates in a head 202 and interposed between the same and the boss 196 of casting 116 and freely rotatable on shaft 198 is a bell crank 203. This bell crank includes a laterally extending arm 204 terminating in a gear sector 206, and a downwardly extending arm 207 having a transversely extending portion 208 provided with a half cup section 209. The bell crank 203 is further provided with a pin 211 to which one end of a coil spring 212 is attached.

The pivot shaft 199 is likewise provided with a head 216 and interposed between the same and the boss 197 of casting 116 and freely rotatable on shaft 199 is a bell crank 217. The bell crank 217 includes a laterally extending arm 218 and a downwardly extending arm 219 having a transversely extending portion 221 provided with a half cup section 223. The laterally extending arm 218 of bell crank 217 terminates in a gear sector 224 the teeth of which intermesh with the teeth of the gear sector 206 of the arm 204 of bell crank 203 (Fig. 17) whereby equalized movement of the bell cranks 203 and 217 and cup sections 209 and 223 is assured. The bell crank 217 is also provided with a pin 226 to which the other end of coil spring 212 is secured.

The cup sections 209 and 223 form, when they are adjacent each other, i. e. in closed position, a conical stem end centering cup 227 concentrically positioned below the pear centering and holding arms 149 and 161 and forming a feed pocket 228 in conjunction therewith within which the pear is received stem end down from the fruit receiving unit A, previously described herein.

Fixed to the plate 135 (Figs. 1 to 4 and 9) is a horizontally disposed cam plate 231, and interposed between the same and guide rail 136 is a filler block 232 to assure a more rigid mounting thereof. This cam plate 231 engages beneath the pin 211 of bell crank 203 and holds the stem and centering cup 227 slightly open against the tension of spring 212 when the feed unit B is in upright or vertical position, i. e., with the axis of the feed pocket 228 vertically disposed as shown in Figs. 2, 9 and 17. The purpose of this will be explained later on.

Extending laterally from the casting 116 toward plate 135 (Figs. 4, 9, 10, 17 to 21, 24 and 25) and forming an integral part therewith is a guide block 233 provided with a cam way 234 adapted to receive a stationary pin 236 extending from the plate 135 into the path of block 233. The pin 236 extends through a hole 237 in the plate 135 and is fixed thereto and guide rail 136 thereof by means of a screw 238 (Fig. 9). This guide block 233 and stationary pin 236 cooperate to tilt the feed unit B from vertical to horizontal and back to vertical position during reciprocation of the feed unit B by the cam cylinder 36. A stop pin 239 fixed to the bracket 122 for movement therewith extends through the slot 134 of plate 135 and forms a stop for the guide block 233, engaging face 240 thereof to prevent tilting of the feed unit B beyond the horizontal position thereof, i. e., the position shown in Fig. 19. The tilting operation of the feed unit B will be specifically described later on.

As above explained, the stem end centering cup is normally urged toward closed position by the action of coil spring 212. The opening of the stem end centering cup is effected by an abutment block 241 secured to the transverse extension 141 of the plate 135. This abutment block engages an extension 242 on bell crank 217 (Fig. 20) when the feed unit B is in its horizontal or tilted position and is shifted from the position of Fig. 19 to the position of Fig. 20. In this latter position the cup is held open by the coil spring 212 since pins 211, 226 and spring 212 are now positioned at the lefthand side of the centers of pivot shafts 198, 199 of bell cranks 203 and 217, respectively (Fig. 20) as compared with the position of spring 212 and pins 211, 226 at the right hand side of the centers of pivot shafts 198 and 199 in Fig. 19 when the cup is closed. This toggle action assures holding of the stem end centering cup 227 in open or closed position. The opening of the cup 227 to the desired extent is limited by the face 243 of the guide block 233 against which the arm 204 of bell crank 203 abuts (Fig. 20). Likewise the closing of cup 227 is limited to the desired extent by contact of arm 207 of bell crank 203 with an abutment face 244 of guide block 233 (Fig. 19).

The closing of the stem end centering cup 227 from its open position (Fig. 21) to its closed position (Fig. 17) is effected by a stationary cam plate 246 on stationary plate 135 which engages pin 226 upon the return movement of the feed unit B (Fig. 21). This operation is specifically described later herein. The arm 219 of bell crank 217 is further provided with an abutment 247 which is adjacent a curved bar 248 secured to the transverse extension 141 of plate 135 when the feed unit B is in fruit receiving position (Figs. 9 and 17) so that any accidental opening of the stem end centering cup in this position is prevented.

Secured to bosses 250, 251 on bracket 122 by means of a cap screw 252 and the stop pin 239 which is provided with a nut 239ᵃ is a cam plate 253 having an extension 253ᵃ provided with an inclined end 254 adapted to cooperate with a control valve of the pneumatic control mechanism D in a manner to be specifically explained later on.

Mounted on the free end of the horizontally and transversely extending portion 141 of plate 135 is the stem end gauging and cutting mechanism G which comprises a socket 256 within which a stud shaft 257 provided with a head 258 is fixed by means of a set screw 259 (Figs. 12 and 13). The inner ends of the socket 256 and stud shaft 257 are cut off at an angle for clearance purposes. Interposed between the socket 256 and head 258 and freely rotatable on stud shaft 257 is a pinion 261 having a sleeve 262 forming an integral part therewith. Fixed to the sleeve 262 by a set screw 263 is an arm 264 provided with a stem end gauge plate 266 which forms an integral part of the arm and a removable stem end cutting knife 267 secured thereto by screws 268 and provided with a cutting edge 269. The gauge plate 266 is U-shaped (Fig. 9) and defines an opening 270 bordered by straight sides 271, 272, semi-circular end 273 and the straight cutting edge 269 of the knife 267. The continuous U-shaped edge formed by the sides 271, 272 and end 273 is inwardly declined as shown at 274 in Fig. 23.

Fixed to the end 38 of the reciprocating cam cylinder 36 is a rack 276 (Figs. 1, 12 and 13) provided with teeth 277, a cut-out portion 278 and a flat portion 279. The teeth 277 extend above the flat surface 279 of the rack 276 (Fig. 22).

During part of the movement of the rack toward the right (Figs. 17 to 19) the teeth 277 thereof intermesh with the teeth of pinion 261 which has one tooth removed at 261ᵃ (Fig. 22) and the pinion 261 is rotated and arm 264, gauge plate 266 and stem end cutting knife 267 are swung from the position shown in Fig. 17 to the position shown in Figs. 19 and 22. When the arm 264 is in the position of Fig. 19 the pinion 261 has disengaged from the teeth of the rack 276 and a straight face 280 of a projection 281 of arm 264 engages the straight portion 279 of the rack 276 (Fig. 22) so that further movement of the rack in the same direction does not operate the pinion 261 and arm 264 is held locked in the position shown in Fig. 22. Upon return of the rack to its original position the teeth of rack 276 again engage the pinion 261 and rotate the same in the opposite direction whereby the arm 264, gauge plate 266 and knife 267 are returned to their original position as shown in Fig. 17. The cut-out portion 278 of the rack 276 receives the projection 281 of the arm 264 when the same is swung from one to the other position to prevent interference between the projection 281 and rack 276.

The gauge plate 266 is positioned in closely spaced relation below the stem end centering cup 227 when the feed unit B is in upright or fruit receiving position (Figs. 9 and 17). The opening 270 of the gauge plate 266 is accurately centered with respect to the open apex portion of the cup so that when a pear is dropped into the feed pocket 228 stem end down by the fruit receiving unit A the stem end of the pear enters opening 270 of gauge plate 266 and is guided into a centered position therein by the declined U-shaped edge 274 which subsequently supports the stem end of the pear in the centered position referred to. The opening 270 is of such size that only a small portion of the stem end of the pear (Fig. 23) can enter the same and project therethrough a slight distance below the gauge plate 266. While the stem ends of different pears will enter the opening 270 more or less depending upon the size and configuration of the stem ends of the fruit as an average, however, they will be held by the gauge plate 266 projecting substantially the same amount through the same. Therefore, when arm 264, gauge plate 266 and knife 267 are subsequently swung from the position of Fig. 17 to the position of Fig. 19, the knife 267 cuts a substantially predetermined portion from the stem end of the pear (Fig. 18) without cutting either too much or too little meat from the stem end of the fruit. Since the cutting off of the stem end of the pear is performed during the tilting movement of the feed unit B from the position of Fig. 17 to the position of Fig. 19 the cut will be straight and not curved as will be obvious to those skilled in the art.

The fruit pusher E and actuating mechanism F therefor consist of a pair of opposing bearings 291, 292 secured to plate 123 by means of cap screws 293 (Figs. 1, 2, 13 and 26) within which bearings a pusher rod 294 provided with a knob 296 having a spike 297 is slidably mounted. The knob 296 is threadedly mounted on rod 294 at 294a and is held in adjusted position by a lock nut 298. The fruit engaging face of the knob is concave as shown at 299 (Fig. 26) to conform closely to the contour of the calyx end of the pears and the spike 297 is positioned concentric with respect to the curved fruit engaging surface 299.

Extending transversely through the rod 294 and fixed thereto intermediate the bearing 291 and 292 is a pin 301 (Figs. 13 and 26) which is slidably received within slots 302 and 303 of a yoke 304 which straddles the rod 294 and forms an integral part of a bell crank 306 pivotally mounted by means of a pivot pin 307 on a bracket 308 secured to plate 123 carried by the cam cylinder 36.

Figure 3:
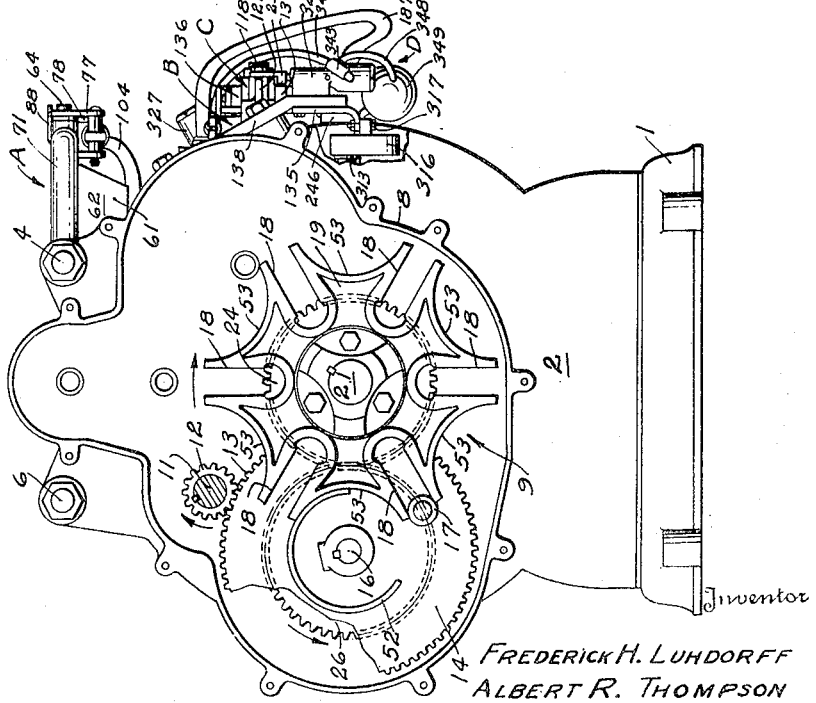
Fig. 3 is a transverse section of the drive mechanism of the pear preparation machine taken along lines 3—3 of Fig. 2.

The bell crank 306 comprises arms 309 and 311. The yoke 304 forms a part of arm 309 and rotatably mounted on the free end of arm 311 by means of a pivot pin 312 is a cam roller 313 which travels in a cam track 314 of a stationary cam 316 secured to the stationary plate 135 by screws 317 (Figs. 1 and 3). Upon reciprocation of the cam cylinder 36 and plate 123 the rod 294 supported thereby is reciprocated therewith and is moved relative thereto by the operation of the bell crank 306 under the control of roller 313 and the stationary cam 316 in a manner to be fully described later on.

The pneumatic control mechanism D comprises three air control valves 326, 327 and 328 (Figs. 1, 2, 12, 13, 14, 15 and 16). The control valve 326 comprises a housing 329 provided with an air inlet 331 connected to a pipe 332, and an air outlet 331a to which the other end of the flexible hose 104 previously referred to is attached. The control valve 327 consists of a housing 333 provided with an air inlet 334 connected to a pipe 336. Both pipes 332 and 336 are connected to an air supply pipe 337 by means of a T fitting 338. The supply pipe 337 is provided with a pressure regulator 339 of conventional construction and leads to a source of compressed air, i. e., the tank of an air compressor unit not shown. Any suitable air pressure may be employed but a pressure of about 35 to 45 lbs. per sq. in. has been found very satisfactory. The housing 333 of valve 327 comprises further an air outlet 341 which is connected by a pipe 342, a T fitting 343 and a branch pipe 344 with the inlet 346 of the housing 347 of valve 328 and by the T fitting 343 and a branch pipe 348 with a tank 349. The housing 347 of valve 328 is further provided with an outlet 351 to which the other end of the flexible hose 187, previously referred to, is connected.

The valves 327 and 328 are provided with actuating rods 352 and 353, respectively and are mounted on the standard 3 (Fig. 14) so that the actuating rods 352 and 353 thereof extend into the path of cams 354 secured to sockets 356 which carry the stemming tubes 32 on the turret 31 of the machine.

The interior construction of valves 326 and 327 is the same and therefore only the interior construction of valve 326 is described. The housing 329 of valve 326 (Fig. 15) is divided into two chambers 357 and 358 by means of a valve 359 forming an integral part of the actuating rod 352 and cooperating with a valve seat 361 of the housing 329. A coil spring 362 positioned in the chamber 358 intermediate valve 359 and a removable closure cap 363 normally holds the valve 359 in closed position and interrupts the flow of compressed air from the inlet and chamber 358 to the chamber 357 and the outlet of the valve. However, when the actuating rod 352 (or in case of valve 327, the actuating rod 353) is depressed by one of the cams 354, the valve 359 is opened against the tension of the coil spring 362 and compressed air is permitted to flow through the valve and from the outlet thereof.

The control valve 328 is of a different construction. The housing 347 of this valve is divided into two chambers 366 and 367 (Fig. 16) by a valve 368 forming an integral part of a control rod 369 slidably mounted in the housing 347 and projecting a distance therefrom. A coil spring 371 interposed between valve 368 and a removable closure cap 372 in chamber 366 holds the valve 368 normally in closed position in engagement with a valve seat 373 of the housing 347. The inlet and outlet of valve 328 both lead into the chamber 366 and the valve 368 does therefore not interrupt the flow of compressed air between same. The valve housing 347 is further provided with a plurality of holes 374 which establish communication between the chamber 367 and the atmosphere so that when the actuating rod 369 of valve 328 is depressed valve 368 opens and releases compressed air from the chamber 366 and therefore from the inlet 346 and outlet 351 through chamber 367 and openings 374 into the atmosphere.

The valve 328 (Figs. 4 and 14) is mounted by means of cap screws 376 to the stationary plate 135 in such a position that the actuating rod 369 is engaged and depressed by the inclined end 254 of the cam 253 secured to the bracket 122 upon reciprocation thereof in conjunction with the reciprocation of cam cylinder 36 and feed unit B as later described herein.

*Operation*

During the operation of the pear preparation machine, the turret 31, the stemming tubes 32, and cams 354 are intermittently rotated in the direction of arrow 401 (Figs. 4 and 14) by the Geneva drive mechanism 14, 19, previously referred to herein while the sleeve 22, arm 48 and cam roller 51 are continuously rotated in the same direction by means of gears 24 and 26. During the rotation of the arm 48 and cam roller 51 the latter travels along the cam track 39 whereby the cam cylinder 36 is reciprocated on the turret shaft 21 and sleeve 22 in timed relation with respect to the intermittent rotation of the turrett 31 and stemming tubes 32.

Starting now with the cycle of operation of the machine and the feed mechanism of the present invention, immediately before the discharge of a pear from the fruit receiving unit A into the feed unit B, the respective parts of the machine above referred to are in the positions as shown in Fig. 1 in which the cam cylinder 36 is in its extreme left-hand position, the roller 51 has just entered the straight portion of the cam track 42, the fruit receiving pocket 61 of the unit A is in closed or fruit receiving position and the operator has fed a pear stem end down into the pocket 61 of the unit A. The feed unit B is in its upright fruit receiving position (Figs. 1, 2, 4, 9 and 17) with the fruit holding and centering arms 149, 161 open, and the stem end centering cup 227 is in substantially but not fully closed position. The gauge plate 266, the stem cut-off knife 267 and the pusher E are in the positions shown in Figs. 9 and 17 and all three control valves 326, 327 and 328 are in closed position.

At this moment the Geneva drive pin 17 has just entered one of the slots 18 of the Geneva gear 19 (Fig. 3) and while the operation of the machine continues the Geneva driver effects one-sixth of a revolution of the turret 31 and during this period the roller 51 is travelling through the portion 42 of the cam slot 39 so that the cam 36 remains stationary.

During this one-sixth of a revolution of the turret 31, one of the stemming tubes 32 designated 402 in Fig. 14 and the cam 354 associated therewith and designated 403 are moved from position I to position II (Fig. 14) while all other stemming tubes 32 and cams 354 are moved accordingly one step ahead of their respective positions.

Immediately upon commencement of the rotation of the turret 31, i. e., upon movement of the stemming tube 402 from position I to position II cam 403 moves rapidly past the actuating rod 352 of the control valve 326, momentarily depressing the same whereby the valve 326 is opened and immediately closed again under the action of spring 362. During this brief opening of the valve 326 compressed air from the pipe 337 is admitted through the hose 104 into the cylinder 94 causing relative movement of the cylinder 94 and piston 95 and rapid opening of the fruit receiving pocket 61 (Fig. 8) whereby the pear positioned therein is dropped downwardly between the opened pocket sections 62, 63 into the pocket 228 of the feed unit B which, as above stated, is at this moment in fruit receiving position beneath the pocket 61. As soon as the valve 326 is closed the pocket 61 is rapidly closed under the action of the coil spring 102.

As the pear drops stem end down from pocket 61 into the pocket 228 of the feed unit B the stem end of the pear is received within the stem end centering cup 227 and enters the opening 270 of the gauge plate 266 until the inclined edge 274 of the opening supports the pear. While the pear is dropped into the feed unit B, as above described, the stem end centering cup 227 is not entirely closed but is held slightly open against the action of spring 212 by the plate 231 which is in engagement with pin 211 of bell crank 203 and prevents complete closing of the cup. The slightly open position of the centering cup 227 assures that the stem end of the pear enters the opening 270 and engages the gauge plate 266 without being held back by the cup 227 in case the stem end of the pear is thicker than the opening defined by the closed cup.

While the pear is now held in this position by the gauge plate 266 within the stem end centering cup 227 and with the bulb of the pear positioned between the open pear centering and holding arms 149 and 161, the stemming tube 402 and cam 403 complete their movement from position I to position II (Fig. 14). When the stemming tube 402 and cam 403 reach position II (Fig. 14) the drive pin 17 disengages from the slot 18 of the Geneva gear 19 with which it was in cooperation and the Geneva lock 52 comes into engagement with one of the arcuate faces 53 of the Geneva gear and locks the turret 31, with the stemming tube 402 and cam 403 properly indexed at the position II. However, just before the cam 403 reaches its indexed position II it travels past the actuating rod 353 of the control valve 327 and momentarily depresses the same whereby this valve is briefly opened and closed and compressed air is admitted from the conduit 337 (Figs. 1 and 2) through pipe 342, T fitting 343, branch pipe 344, valve 328 and flexible hose 187 into the cylinder 178 and also through T fitting 343 and branch pipe 348 into tank 349. The compressed air entering cylinder 178 forces piston 181 in the direction of arrow 191 (Fig. 10) and causes closing of the pear centering and holding arms or clamps 149 and 161 upon the bulb of the pear. This position of clamp arms 149 and 161 is shown in Fig. 10.

When the clamp arms 149 and 161 close upon the fruit the bulb end of the pear is centered therebetween with the stem blossom axis of the pear disposed in vertical position and is firmly held in said position under the pressure of the air trapped in pipes 342, 344, valve 328, hose 187, cylinder 178 and pipe 348 and tank 349 after valve 327 has closed. The tank 349 merely serves as a reservoir which contains a sufficient volume of compressed air to maintain sufficient air pressure in the cylinder 178 to hold the clamps 149 and 161 firmly closed upon the pear in the event a small leak should occur in the hose 187 or valves 327 and 328. If all connections of pipes 342, 344 and hose 187 and valves 327 and 328 are air tight the tank 349 is not absolutely necessary and the same as well as branch pipes 344, 348 and T fitting 343 may be eliminated. In such case the end of pipe 342 is directly connected to the inlet 346 of the valve 328 (Fig. 16).

During the closing of the clamp arms 149 and 161 their free ends 408 and 409, respectively (Fig. 10), move substantially tangential with respect to the periphery of the bulb of the fruit so that upon contacting the fruit a slight rotation of the fruit about its stem blossom axis in the direction of arrow 411 (Fig. 10) is obtained which assists the centering of the bulb end of the pear between the clamps and prevents pinching of the fruit due to irregularities of the same along the periphery of the bulb portion thereof.

It should also be observed that at the region of points 152 and 162 at the free ends of clamp arms 149 and 161 a small portion of the contact surface of the clamps is cut away as will be clearly seen at 412 and 413 in Figs. 9 and 10 to assure substantially simultaneous engagement of the bulb of the pear by the clamping arms 149 and 161 at four points thereof, namely, diametrically opposite points 152, 162 and 153, 163, for all sizes of pears to be handled by the feed unit B.

When the turret 31 comes to rest with the stemming tube 402 and cam 403 now in position II (Fig. 14) and while the bulb of the pear is firmly held between the clamps 149 and 161 of the feed unit B, as above explained, the roller 51 leaves the portion 42 of the cam slot 39 and enters the angular portion 43 thereof at 404 (Fig.

1) and while the roller 51 continues its rotation in the direction of arrow 401 (Figs. 4 and 14) and travels from point 404 to point 416 (Fig. 2) of the cam slot 39 the cam cylinder 36 is shifted in the direction of arrow 417 (Figs. 1 and 2) along sleeve 22 and turret shaft 21.

While the cam cylinder 36 is shifted from its lefthand position shown in full lines in Fig. 1 to its righthand position shown partially in dotted lines at 418 in said figure the plate 123, bracket 122, bearings 291, 292, pusher rod 294, bell crank 306 and rack 276 which are interconnected with the cam cylinder 36 as previously explained herein are shifted therewith from the position shown in Fig. 1 to the position illustrated in Fig. 13.

At the moment the shifting movement of cam cylinder 36 and the parts associated therewith commences the feed unit B is in the position shown in Figs. 1, 2 and 17. The stationary pin 236 which is fixed to the stationary plate 135 is positioned within the curved camway 234 and the stem end centering cup 227 is substantially but not completely closed. The bulb of the pear is firmly held between the clamps 149 and 161, and the gauge plate 266 and stem end cutting knife 267 and their associated parts are in the positions shown in Fig. 17.

During the movement of the cam cylinder 36 and bracket 122 in the direction of arrow 417 (Fig. 1) the boss 121 and pivot shaft 118 rotatably mounted therein and the entire feed unit B supported on the shaft 118 are shifted in the direction of arrow 421 (Fig. 2) from the position shown in Figs. 1, 2 and 17 to the position shown in Fig. 13 with the portion 133 of the boss 121 guided between the guide rails 136 and 137. Since the pin 236 is stationary and projects into the curved track 234 of the guide block 233 a camming action between the cam track 234 and pin 236 takes place and while the pivot shaft 118 and feed unit B move in the direction of arrow 421 (Fig. 2) the feed unit B with the pear firmly held therein is swung in the direction of arrow 422 from its vertical or upright position of Fig. 17 to its horizontal or tilted position of Fig. 19 and is subsequently shifted to the position shown in Fig. 13.

During the initial part of the tilting movement of the feed unit B about the axis of shaft 118 and before the feed unit is in the position shown in Fig. 18 which illustrates a position intermediate Figs. 17 and 19, the pin 211 disengages from the cam plate 231 and the spring 212 completely closes the stem end centering cup 227 so that the arm 207 of the bell crank 203 (Fig. 18) now contacts the abutment 244 on the guide block 233. Upon closing of the stem end centering cup 227 the sections 209 and 223 thereof engage the stem end of the pear (Fig. 23) and finally align and firmly grip the same so that the pear is now firmly held by the clamps 149, 161 and the cup sections 209 and 223 with the stem blossom axis of the fruit concentric with the vertical axis of the feed pocket 228 formed by said clamps and cups.

While the feed unit B is shifted and tilted from the position of Fig. 17 to the position of Fig. 19 the rack 276 is shifted in the direction of arrow 423 (Figs. 1, 17 and 18). Since the teeth 277 of the rack 276 intermesh with the teeth of the pinion 261, the pinion is rotated in the direction of arrow 424 (Fig. 17) and the arm 264, gauge plate 268 and knife 267 are swung in the direction of arrow 424 from the position in Fig. 17 to the position in Fig. 19. During this swinging movement the knife 267 cuts the stem end from the pear (Fig. 18). It is to be understood that this cutting operation takes place simultaneously with the tilting and shifting of the feed unit B. It commences immediately after the closing of the stem end centering cup 227 so that the stem end of the pear is firmly held during the stem cutting operation. It is further to be observed that although the knife 267 swings in an arcuate path about the axis of stud shaft 257, the cut performed thereby is not curved but straight since the tilting of the feed unit B and the pear held therein incident to the cutting operation modifies the cutting action of the knife so that the knife travels in a straight path relative to the stem end of the fruit during the cutting operation as previously explained herein. In view of the gauging action of the gauge plate 266 upon the stem end of the fruit during introduction thereof into pocket 228 of the feed unit B the portion cut from the stem end of the pear is held at a minimum for all sizes of pears whereby waste is materially reduced.

After the above described operations have been performed and before the feed unit B arrives at the position illustrated in Fig. 19 the teeth 277 of the rack 276 move beyond the pinion 261 to the right hand side thereof (Fig. 22) and disengage from said pinion by reason of the toothless space 261a of the pinion 261. When this takes place the projection 281 of arm 264 engages the flat face 279 of the rack 276 and locks the arm 264, gauge plate 266, knife 267 and pinion 261 against further rotation while permitting free sliding movement of the rack 276 with respect thereto. The cut-out portion 278 of the rack provides sufficient space for the projection 281 of arm 264 during swinging movement thereof from the position of Fig. 17 to the position of Figs. 19 and 22.

During the shifting movement of the feed unit B from the position shown in Fig. 17 to the position illustrated in Fig. 19 the pusher E is shifted simultaneously therewith and remains in the same relative position with respect to plate 123 and feed unit B since the cam roller 313 of the bell crank 306 travels along the straight portion 428 of the stationary cam 316 (Fig. 26).

When the feed unit B is in the position shown in Fig. 19 the face 240 of the guide block 233 engages the stop pin 239 so that any further tilting of the feed unit B beyond the position illustrated in Fig. 19 is prevented (see also Fig. 25).

When the feed unit B is in the position shown in Fig. 19 the axis of the feed pocket 228 is horizontally disposed concentric with the axis of the stemming tube 402 which at this time is in position II (Fig. 14), as previously stated. Therefore since the pear in the feed pocket 228 of the feed unit B is accurately centered therein the stem blossom axis of the pear is also concentric with respect to the axis of the stemming tube 402 (Figs. 12 and 19). Consequently when the travel of the feed unit B in the direction of arrow 421 (Fig. 2) continues until the feed unit arrives at the position shown in Figs. 20 and 13 the pear is partially impaled stem end first upon the stemming tube 402.

During the movement of the feed unit B from the position of Figs. 12 and 19 to the position of Fig. 20 the straight portion 431 of the cam track 234 travels along the stationary pin 236 Fig. 19) and finally disengages from the same (Fig. 20). However, before the cam track 234 disengages from the pin 236 the bottom surface of the cam plate 231 engages the straight face 432 of the guide block 233 and the feed unit B, originally held in its tilted position by the pins 236 and 239 (Fig. 19), is now maintained in said position by the cam plate 231 and pin 239 engaging the straight faces 432 and 240 of the guide block 233, respectively (Fig. 20). Thereupon while the feed unit B moves the pear toward the stemming tube 402, the cam roller 313 enters the curved section 434 of the cam track 314 of cam 316 (Fig. 26) whereby the bell crank 306 is rocked about its pivot 307 and shifts the pusher rod 294 from the position shown in Fig. 19 into engagement with the calyx end of the fruit (Fig. 20). The spike 297 penetrates into the calyx of the fruit which at this moment is slightly impaled with its stem end upon the stemming tube 402 so that the pear is now firmly held in properly aligned position, i. e., with its stem blossom axis concentric with the axis of the stemming tube 402 between the knob 296 of the pusher 294 and the stemming tube 402.

The slight impalement of the stem end of the fruit above referred to takes place while the pear is firmly held between the clamps 149 and 161 and the sections 209 and 223 of the cup 227 and is moved thereby stem end first upon the stemming tube 402. While the fruit is now held between the pusher E and the stemming tube 402 and while the feed unit B continues its movement in the direction of arrow 421 (Fig. 2) the pear is further impaled upon the stemming tube 402 until the feed unit B reaches the position as shown in Fig. 20. At this moment the extension 242 of the bell crank 217 strikes against the abutment block 241 held in fixed position on the transverse extension 141 of the stationary plate 135 (Fig 20) whereby the bell crank 217 is rocked about its pivot 199 and bell crank 203 is rocked in conjunction therewith about its pivot 198 so that under the action of spring 212 the stem end centering cup 227 is opened i. e. the sections 209 and 223 thereof are moved apart until the arm 204 of bell crank 203 strikes the surface 243 of guide block 233 and further opening of the cup 227 under the action of spring 212 is prevented.

Immediately after the opening of cup 227, as above explained, the cam plate 253 (Fig. 13) engages the actuating rod 369 of the valve 328 whereby the valve is opened and the compressed air trapped within the cylinder 178, hose 187, pipe 342 and tank 349, as above explained, is suddenly released through openings 374 of valve 328 into the atmosphere and the arms 149 and 161 are opened, under the action of coil spring 189, to their fully opened position in which the arm 161 contacts the abutment screw 172 (Fig. 9). With the cup 227 and the clamps 149 and 161 in fully opened position and with the pear now solely held between the stemming tube 402 and the pusher E the pear is now further impaled to the desired extent upon the stemming tube 402 by the pusher E, and the impalement of the fruit is completed when the parts are in the position shown in Fig. 13.

At this moment the cam roller 51 which causes actuation of the cam cylinder 36 reaches the point 416 of cam track 39, previously referred to. While the cam roller 51 now travels through the angular slot portion 43' from point 416 back to point 441 (Figs. 1 and 2) the cam cylinder 36 and the parts associated therewith including the feed unit B are returned to their original position. In other words, the cam cylinder 36 returns from its position as partially shown in dotted lines at 418 in Fig. 1 to its full line position in said figure and the feed unit B returns from its position in Fig. 13 to its position illustrated in Fig. 17. Likewise the pusher E is retracted from its position shown in Fig. 13 to its position illustrated in Fig. 17.

During the first part of this return movement and while the cam roller 313 of bell crank 306 (Fig. 26) travels along the cam-way section 434 of cam 316 the pusher rod 294 is moved relative to the plate 123 in the direction of arrow 442 until it is out of the path of swinging movement of the feed unit B and substantially in the position as shown in Fig. 21. The pin 236 reenters the camway 234 and cooperates therewith so as to swing the feed unit B from its horizontal or tilted position back to its vertical or upright position. This operation is exactly the reverse of the tilting operation of the feed unit B, previously described herein and it commences as soon as the straight face 432 of the guide block 233 disengages from the cam plate 231.

As soon as the tilting action of the feed unit B commences (Fig. 21) the pin 226 strikes the edge 246ᵃ of the plate 246 whereby the bell crank 217 is rocked in the direction of arrow 443 (Fig. 21) and the stem end centering cup 227 is closed under the action of coil spring 212 until the arm 207 of bell crank 203 strikes against the abutment 244 on guide block 233. The cam plate 253 disengages from the actuating rod 369 and valve 328 is closed. The rack 276 which actuates gauge plate 266 and stem end cutting knife 267 engages with its teeth 277 the pinion 261 and the arm 264, gauge plate 266 and the cutting knife 267 are returned to their original position as shown in Fig. 17.

When the cam roller 51 has reached point 441 of the cam slot 39 the pin 17 begins to enter the next slot 18 of the Geneva gear 19 (Fig. 3) and the feed unit B and its associated parts are in the position as shown in Fig. 17. It should be noted, however, that upon the return movement of the feed unit B to this position the cam plate 231 engages the pin 211 shortly before the feed unit reaches its vertical position whereby a slight rocking movement of bell crank 203 in the direction of arrow 446 (Fig. 17) is effected and the stem end centering cup 227 is slightly opened thereby so that the feed unit is now again in fruit receiving position.

The cycle of operation of the machine thereupon repeats with respect to the next stemming tube which is then moved to the position II by the Geneva drive 14, 19 in the same manner as was the stemming tube 402 and continues in this way with regard to each succeeding stemming tube of the turret 31.

It is to be understood, of course, that the pears impaled in this manner upon the stemming tubes 32 are subsequently presented by the tubes to peeling, coring, calyx trimming and splitting devices associated with the turret 31, but not shown herein, which perform the desired operations upon the fruit, and before each stemming tube is returned to its position II (Fig. 14) the fruit impaled thereon is discharged therefrom. The construction and operation of these parts of the machine will be fully understood from the disclosure of the Thompson et al. patent previously referred to herein.

From the above it will be seen that after a pear has been deposited stem end down into the receiving pocket 61 of the machine and has been discharged therefrom into the pocket 228 of the feed unit B, the pocket 61 is immediately closed and is ready to receive the next pear and stays in this receiving position during the entire operation of the feed unit B so that the operator has sufficient time to conveniently feed the next fruit thereto. It is of course necessary that the operator time his motions so that he will have the pear deposited into the pocket 61 before the same opens again which occurs when the feed unit B has returned to its receiving position.

While for purposes of this disclosure the feed mechanism of the present invention has been illustrated in connection with a pear preparation machine of the type illustrated in the Thompson et al. patent previously referred to herein, it is to be understood, however, that the same may be employed in connection with other types of pear preparation or fruit handling machines as will be obvious to those skilled in the art.

It will also be understood that the invention is not limited to the precise details of construction illustrated but that various modifications and variations may be resorted to without departing from the spirit or scope of the invention and we deem ourselves entitled to all such modifications and variations as come within the scope of the claims appended hereto.

What we claim as new and desire to protect by Letters Patent is:

1. A pear feeding mechanism comprising a plurality of supporting members cooperatively arranged to form a pear supporting receptacle for the reception of a pear stem end down therein, means for causing relative movement between said supporting members to release the pear from said receptacle and allow it to fall by gravity therefrom, a pivotally mounted transfer unit disposed beneath said pear holding receptacle and provided with an open ended pear holding pocket arranged to receive in stem end down position the pear released from said receptacle at one end thereof, means for actuating said transfer unit to tilt the pear into horizontal position, and means for discharging the pear in said position from the other end of the transfer unit.

2. A feed mechanism for feeding pears to a fruit holder, comprising a plurality of supporting members cooperatively arranged to form a pear supporting receptacle for the reception of a pear stem end down therein, means for causing relative movement between said supporting members to release the pear from said receptacle and allow it to fall by gravity therefrom, a transfer unit disposed beneath said pear holding receptacle and provided with a pear holding pocket arranged to receive and position, stem end down, the pear released from said receptacle, means for actuating said transfer unit to tilt the pear into horizontal position for transfer, stem end first, to said fruit holder, means for moving said transfer unit horizontally to partially impale the pear upon said fruit holder, and means cooperating with said transfer unit for discharging the pear therefrom and for completing impalement thereof upon said fruit holder.

3. A feed mechanism for feeding pears to a horizontally disposed fruit holder comprising a fruit receiving unit having normally closed separable sections forming a vertically disposed pocket for receiving a pear stem end down therein, means for separating said sections to discharge the pear therefrom, a fruit transfer unit having a pocket alternately movable to vertical and horizontal position into and out of axial alignment with the pocket of the fruit receiving unit and fruit holder, respectively, for receiving the pear stem end down from the fruit receiving unit and for aligning the pear with its stem blossom axis coaxial with said holder, and means for transferring the pear in said aligned position stem end first from the pocket of the transfer unit to said holder.

4. A mechanism for feeding pears to a horizontally disposed intermittently movable fruit holder comprising a fruit centering and holding pocket movable to fruit receiving and discharging position in timed relation with the intermittent movement of said holder for receiving and centering a pear deposited stem end down into said pocket at one end thereof when said pocket is in receiving position and for aligning the pear with its stem blossom axis coaxial with the axis of the fruit holder when said pocket is in discharging position and said fruit holder is at rest, and means cooperating with said pocket for shifting the pear through said pocket and for discharging the pear from the other end of said pocket onto said holder.

5. A feed mechanism for feeding fruit to a horizontally disposed intermittently movable fruit holder comprising a stationary fruit receiving unit for receiving a piece of fruit therein, a feed unit movable into fruit receiving position below said stationary unit for receiving the piece of fruit therefrom and movable toward and into axial alignment with the horizontally disposed fruit holder to impale the piece of fruit thereon when said holder is at rest, and fluid pressure actuated means for operating said fruit receiving and feed units to release the pear therefrom in timed relation with the intermittent movement of the fruit holder.

6. A feed mechanism for feeding fruit to a horizontally disposed movable fruit holder comprising vertically disposed stationary fruit receiving means having cooperating normally closed separable sections for receiving and holding a piece of fruit therebetween, fruit feeding means below said holder movable into axial alignment with the vertically disposed fruit receiving means and said horizontally disposed holder and having cooperating sections for aligning and holding a piece of fruit therein, fluid pressure actuated means for opening the sections of the stationary fruit receiving means to instantaneously discharge the piece of fruit therefrom into said movable feeding means when the same is in axial alignment therewith, fluid pressure actuated means for operating the sections of the feeding means to center and hold the piece of fruit received therein, means cooperating with the fruit holder for controlling the operation of the fluid pressure actuated means of the stationary fruit receiving means and said feeding means, and means for moving said feeding means toward and into axial alignment with said horizontally disposed holder to impale the fruit thereon.

7. A feed mechanism for feeding fruit to a horizontally disposed fruit holder comprising vertically disposed stationary fruit receiving means having cooperating normally closed separable sections for receiving and holding a piece of fruit therebetween, fruit feeding means below said holder alternately movable into axial alignment with the vertically disposed fruit receiving means and said horizontally disposed holder and having cooperating sections for aligning and holding a piece of fruit therein, fluid pressure actuated means for operating the sections of the stationary fruit receiving means to discharge the piece of fruit therefrom into said movable feeding means when the same is in axial alignment therewith, fluid pressure actuated means for operating the sections of the feeding means to center and hold the piece of fruit received therein from said stationary receiving means, means for moving said feeding means toward and into axial alignment with said horizontally disposed holder to impale the fruit thereon, and means cooperating with the fluid pressure actuated means of the feeding means for operating the cooperating sections of the feeding means to release the impaled fruit therefrom.

8. A feed mechanism for feeding pears to a horizontally disposed fruit holder of an intermittently rotating turret of a fruit handling machine, comprising a stationary fruit receiving unit having cooperating normally closed separable sections adapted to receive and hold a pear stem end down therebetween, a fruit feeding unit below said receiving unit alternately movable to fruit receiving and feeding positions and having cooperating means for centering and firmly holding a pear therein, and fluid pressure actuated means operable in timed relation with the intermittent rotation of the turret and fruit holder for operating said fruit receiving and feeding units to momentarily separate the sections of the fruit receiving unit at the time the feeding unit is in fruit receiving position therebeneath to instantaneously release the pear and allow it to drop stem end down into the feeding unit and to center and firmly hold the pear in said feeding unit, means for moving the feeding unit into feeding position toward said holder with the stem blossom axis of the pear disposed in axial alignment therewith to partially impale the pear upon said holder when said holder is at rest, means cooperating with said fluid pressure actuated means to release the partially impaled pear from the holding means of the feeding unit, and means associated with the feeding unit to complete the impalement of the pear upon said fruit holder after release of the pear from the holding means of the feeding unit.

9. A feed mechanism for feeding fruit to a fruit holder comprising a stationary fruit receiving unit for receiving and holding the fruit with its stem blossom axis normal to the axis of the holder, means for discharging the fruit in said position from said receiving unit, a feed unit for receiving the discharged fruit therein, means for locking the fruit in said feed unit, means for reciprocating the feed unit toward and away from the fruit holder and for tilting the feed unit incident to its reciprocation to align the stem blossom axis of the fruit with the axis of the holder to thereby partially impale the fruit in said position upon movement of the feed unit toward said holder, a fruit pusher cooperating with the feed unit for engaging the fruit and for completing impalement thereof upon said holder, and means for actuating the fruit locking means of the feed unit upon engagement of the fruit by said pusher to release the partially impaled fruit from said feed unit.

10. A feed mechanism for feeding pears to a horizontally disposed intermittently movable fruit holder of a fruit handling machine comprising a stationary fruit receiving unit for receiving and holding a pear stem end down with its stem blossom axis substantially vertical, a feed unit beneath said stationary fruit receiving unit alternately movable to fruit receiving and feeding position for receiving the pear stem end down from said fruit receiving unit, means for operating the fruit receiving unit for discharging the fruit stem end down into the feed unit when the latter is in fruit receiving position, means associated with said feed unit for centering and firmly gripping the pear received thereby and for positioning the pear with a portion of the stem end thereof projecting from said feed unit, means for tilting the feed unit to dispose the pear with the stem blossom axis thereof into axial alignment with the holder and for moving the tilted feed unit toward said holder to partially impale the pear stem end first thereon, means for cutting a portion from the stem end of the pear during tilting of the feed unit, means for actuating said gripping means to release the pear from the feed unit when the pear is partially impaled upon said holder, and means cooperating with said feed unit for engaging the calyx end of the pear incident to the release of the pear by said gripping means and for discharging the pear from said feed unit to thereby complete the impaling of the pear upon said holder.

11. A feed mechanism for feeding pears to a horizontally disposed intermittently movable fruit holder of a pear preparation machine comprising a feed unit having a pear receiving pocket formed by cooperating cup sections for receiving and centering the stem end of a pear deposited stem end down therein and cooperating clamp arms for receiving and centering the bulb of the pear and for firmly holding the pear in centered position in said pocket, stem end cutting means associated with the feed unit, means for gauging the position of the stem end of the pear relative to said cutting means, means for alternately moving the feed unit into pear receiving and discharging position in timed relation with respect to the intermittent movement of the fruit holder, means for depositing a pear stem end down into the pocket of the feed unit when the same is in pear receiving position, means cooperating with said feed unit moving means for tilting said feed unit to dispose the pocket thereof into axial alignment with the fruit holder, and means operable in timed relation with respect to the tilting operation of the feed unit for operating said stem end cutting and gauging means.

12. In a pear feeding mechanism, a transfer unit comprising a holder for receiving and supporting a pear stem end down therein, said holder having a stem end centering cup for centering the stem end of the pear in said holder and cooperating pear clamping members for engaging the bulb of the pear, means for holding the clamping members in open position during introduction of the pear into said holder, and means for closing the clamping members upon the bulb of the pear to center the bulb of the pear in said holder and for moving a portion of said clamping members tangentially with respect to the periphery of the bulb of the pear upon contact therewith whereby the pear is rotated about its stem blossom axis during closing of the clamping members to accurately center the pear and to prevent pinching of the same between said clamping members.

13. In a pear feeding mechanism, a transfer unit comprising a holder for receiving and supporting a pear stem end down therein, said holder having a stem end centering cup for centering the stem end of the pear in said holder, and cooperating pear clamping members for engaging the bulb of the pear, means for holding the clamping members in open position during introduction of the pear into said holder, and fluid pressure operated means for closing the clamping members upon the bulb of the pear to center the bulb end of the pear in said holder and for moving a portion of said clamping members tangentially with respect to the periphery of the bulb of the pear upon contact therewith whereby the pear is rotated about its stem blossom axis during closing of the clamping members to accurately center the pear and to prevent pinching of the same between said clamping members.

14. In a pear feeding mechanism a transfer unit comprising a holder for receiving and supporting the pear stem end down therein, said holder having a pair of normally closed open ended separable cup sections for receiving and centering the stem end of the pear in said holder and cooperating pear clamping arms above said cup sections for engaging the bulb of the pear, means for holding the clamping arms in open position during introduction of the pear into said holder, and means for closing the clamping arms upon the bulb of the pear to center the bulb of the pear in said holder and for moving opposing portions of said clamping arms tangentially with respect to the periphery of the bulb of the pear upon contact therewith whereby the pear is rotated about its stem blossom axis during closing of the clamping arms to accurately center the pear and to prevent pinching of the same between said clamping arms.

15. In a pear feeding mechanism a fruit transfer unit comprising a support, cooperating normally closed separable cup sections movably mounted on said support, cooperating clamping arms pivotally mounted on said support above said cup sections and movable to open and closed position, an equalizer arm pivotally connected to said clamping arms for effecting simultaneous equalized movement of said arms toward and away from each other, means for normally holding said arms in open position, and means for moving said arms to closed position against the action of said holding means.

16. In a pear feeding mechanism a fruit transfer unit comprising a support, cooperating normally closed separable cup sections pivotally mounted on said support, cooperating clamping arms pivotally mounted on said support above said cup sections and movable to open and closed position, an equalizer arm pivotally connected to said clamping arms for effecting simultaneous equalized movement of said arms toward and away from each other, resilient means for normally holding said arms in open position, and fluid pressure actuated means for moving said arms to closed position against the action of said resilient means.

17. In a pear feeding mechanism a fruit transfer unit comprising a support, cooperating normally closed separable cup sections movably mounted on said support, means for effecting equalized opening and closing of said cup sections, cooperating clamping arms pivotally mounted on said support above said cup sections and movable to open and closed position, an equalizer arm pivotally connected to said clamping arm for effecting simultaneous equalized movement of said arms toward and away from each other, means for normally holding said arms in open position, and means for moving said arms to closed position against the action of said holding means.

18. A mechanism for feeding pears to a horizontally disposed intermittently movable fruit holder, comprising a fruit holding and aligning unit having cooperating stem end centering means movable to closed and open position for centering the stem end of the pear in a predetermined position relative to said unit and cooperating clamping and aligning means movable to open and closed position for aligning the bulb of the pear in a predetermined position relative to said unit, means for moving said unit to fruit receiving and discharging position out of and into axial alignment with said fruit holder, respectively, means for closing said stem end centering means when said unit is moved to fruit receiving position while said clamping means are in open position, means for closing said clamping means after a pear has been deposited into said unit while in fruit receiving position to align and hold the pear in a predetermined position therein, means for moving said unit into discharging position and toward said fruit holder to align the pear in predetermined position relative thereto and to partially shift the pear in said aligned position onto said holder while said holder is at rest, means for opening said centering means during movement of the unit to discharge position, pear discharge means for engaging the pear partially shifted onto said holder, means for opening said clamping means to release the pear from said unit, and means for actuating said discharge means to discharge the pear through the open clamping and stem end centering means onto said fruit holder.

19. A feed mechanism for feeding pears to a horizontally disposed fruit holder, comprising a fruit transfer unit having a pear receiving pocket alternately movable to vertical and horizontal position into and out of axial alignment with the fruit holder for receiving a pear stem end down therein and for aligning the pear with its stem blossom axis coaxial to said fruit holder when said pocket is in axial alignment therewith, said transfer unit including means for firmly holding the pear in the pocket thereof, means for transferring the pear in said aligned position through the pocket of the transfer unit to said fruit holder, and means for actuating the holding means of said transfer unit to release the pear from said pocket incident to transfer of the pear to said fruit holder.

20. A feed mechanism for feeding pears to a horizontally disposed fruit holder comprising a stationary fruit receiving unit including normally closed open ended separable sections for receiving and holding a pear stem end down therebetween, means for opening said sections to discharge the pear stem end down therefrom, a transfer unit for receiving the pear stem end down from said receiving unit and for firmly holding the pear therein, means for tilting the transfer unit and for moving the same toward said holder to align the pear with its stem blossom axis coaxial with said holder and to impale the pear thereon, and means cooperating with the transfer unit for trimming the stem end of the pear incident to the tilting movement of the transfer unit.

21. A mechanism for feeding pears to a horizontally disposed fruit holder comprising a fruit support including normally closed separable sections forming an open ended fruit holding pocket for receiving a pear at one end thereof and for firmly holding the pear stem end down therein, means for tilting said fruit support to dispose the pear with its stem end pointing toward said holder and with the stem blossom axis of the pear in axial alignment therewith and for moving the pear toward said holder to thereby impale the pear stem end first thereon, means for separating the sections of said support to release the impaled pear therefrom, and means for moving the fruit support away from the holder to remove the pear from the pocket at the other end thereof.

22. A feed mechanism for feeding pears to a fruit holder comprising a pear receiving and holding pocket, means for feeding a pear stem end first into said pocket at one end thereof, means for actuating said pocket to present the pear held therein stem end first to the fruit holder and to impale the pear stem end first thereon, and means for operating said pocket to release the impaled pear therefrom at the other end of said pocket.

23. A mechanism for feeding pears to a fruit holder comprising an open ended pear receiving pocket, means for moving said pocket into and out of axial alignment with said fruit holder, means for feeding a pear stem end first into said pocket at one end thereof while the pocket is out of axial alignment with the fruit holder, means for firmly holding the pear in said pocket, means for moving said pocket toward and upon said holder to impale the pear stem end first thereon, means for releasing the impaled pear from said holding means, and means for moving said pocket away from said fruit holder to remove the pear from the pocket at the other end of said pocket.

24. A feed mechanism for feeding pears to a fruit holder comprising an open ended openable pear receiving pocket, means for moving said pocket into and out of axial alignment with said fruit holder, means for feeding a pear stem end first into said pocket at one end thereof while the pocket is out of axial alignment with the fruit holder, means for firmly holding the pear in said pocket, means for moving the pocket into axial alignment with the fruit holder, means for reciprocating said pocket toward and away from said holder to impale the pear stem end first thereon, means for opening said pocket, and means for actuating said holding means to release the impaled pear therefrom prior to movement of the pocket away from the fruit holder to effect removal of the pear stem end first from the pocket at the other end thereof upon movement of the pocket away from said holder.

25. A feed mechanism for feeding pears to a fruit holder comprising an open ended pear receiving pocket, means for moving said pocket into and out of axial alignment with said fruit holder, means for feeding a pear stem end first into said pocket at one end thereof while the pocket is out of axial alignment with the fruit holder, means for firmly holding the pear in said pocket, means for moving the pocket into axial alignment with the fruit holder, means for moving said pocket toward said holder to impale the pear stem end first thereon, means for releasing the impaled pear from said holding means, means for moving said pocket away from the fruit holder to remove the pear from the pocket at the other end thereof, and means for trimming the stem end of the pear prior to its impalement upon the fruit holder.

26. A mechanism for feeding pears to a fruit holder comprising a plurality of supporting members cooperatively arranged to form a pear supporting receptacle for the reception of a pear stem end first therein, means for effecting relative movement of said supporting members to release the pear from said receptacle and to allow it to fall by gravity stem end first therefrom, an open ended transfer unit disposed beneath the receptacle for receiving a pear stem end first at one end thereof, means for firmly holding the pear in said transfer unit, means for tilting said transfer unit into axial alignment with the fruit holder to present the pear stem end first thereto, means for moving said transfer unit toward and onto said fruit holder to thereby impale the pears stem end first thereon, means for actuating said pear holding means to release the pear from the transfer unit, and means for moving the transfer unit away from said holder to effect removal of the pear stem end first from said transfer unit at the other end thereof.

27. A mechanism for feeding pears to a fruit holder comprising a cup having cooperating members for receiving a pear stem end first thereon and for discharging the same stem end first therefrom, an open ended transfer unit for receiving the pear stem end first at one end thereof from said cup, means associated with the transfer unit for aligning the pear coaxially therewith and for firmly holding the pear therein, means for reciprocating said transfer unit between said pear receiving cup and fruit holder and for axially aligning the transfer unit and pear with a fruit holder so as to impale the pear stem end first upon said holder upon movement of the transfer unit toward said holder, and means for actuating said pear holding means to release the impaled pear from said transfer unit to effect removal of the pear therefrom at the other end of said unit upon movement thereof away from said holder.

28. A mechanism for feeding pears to a fruit holder comprising a cup having cooperating sections for receiving a pear stem end first therein and for discharging the same stem end first therefrom, a transfer unit for receiving the pear stem end first from said cup, means associated with the transfer unit for aligning the pear coaxially therewith and for firmly holding the pear therein, means for reciprocating said transfer unit between said pear receiving cup and fruit holder and for swinging the transfer unit and pear into axial alignment with the fruit holder so as to impale the pear stem end first partially upon said holder upon movement of the transfer unit toward the same, means for actuating said pear holding means to release the impaled pear from said transfer unit for removal therefrom at the other end thereof upon movement of the transfer unit away from the holder, and means associated with said transfer unit for completing the impalement of the pear upon the fruit holder incident to the release of the pear from the transfer unit.

29. A feed mechanism for feeding pears stem end first to a horizontally disposed fruit holder comprising a fruit receiving mechanism disposed at substantially right angles to said fruit holder for receiving a pear stem end first therein, means for actuating said mechanism for discharging the pear stem end first therefrom, an open ended pear transfer mechanism for receiving the pear stem end first at one end thereof from said receiving mechanism and for firmly holding the pear in said position therein, means for moving said transfer mechanism toward, upon, and away from said holder, means for disposing said transfer mechanism incident to its movement toward said holder into axial alignment therewith so as to present the pear stem end first to the holder and to impale the pear stem end first thereon, and means for operating said pear transfer mechanism to release the impaled pear therefrom for removal thereof at the other end of said transfer mechanism upon movement of the latter away from said holder.

FREDERICK H. LUHDORFF.
    ALBERT R. THOMPSON.

REFERENCES CITED

The following references are of record in the file of this patent:

UNITED STATES PATENTS

| Number | Name | Date |
|---|---|---|
| 908,462 | Warner | Jan. 3, 1911 |
| 1,071,334 | Pease | Aug. 26, 1913 |
| 1,085,628 | Pease | Feb. 3, 1914 |
| 1,217,791 | Luther | Feb. 27, 1917 |
| 1,388,916 | Biggs | Aug. 30, 1921 |
| 1,430,628 | Coons | Oct. 3, 1922 |
| 1,575,185 | Stenhouse | Mar. 2, 1926 |
| 1,718,607 | Soubier | June 25, 1929 |
| 1,745,158 | Fish | Jan. 28, 1930 |
| 1,876,492 | Frove | Sept. 26, 1932 |
| 1,950,791 | Goranson | Mar. 13, 1934 |
| 1,979,322 | Ewald | Nov. 6, 1934 |
| 2,135,219 | Reifsnyder | Nov. 1, 1938 |
| 2,179,529 | Thompson | Nov. 14, 1939 |
| 2,264,361 | Chapman | Dec. 2, 1941 |
| 2,335,620 | Thompson | Nov. 30, 1943 |
| 2,431,310 | Coons | Nov. 25, 1947 |